United States Patent
Ohta et al.

[11] Patent Number: 5,974,251
[45] Date of Patent: Oct. 26, 1999

[54] MEDIA FLOW CONTROL SYSTEM

[75] Inventors: Sachiko Ohta; Masaaki Yoshikawa; Kenji Sohma; Hiroyuki Shiozawa, all of Tokyo; Ryota Suehiro, Yokohama, all of Japan

[73] Assignee: Matsushita Electric Industrial Co., Ltd., Osaka, Japan

[21] Appl. No.: 08/903,791

[22] Filed: Jul. 31, 1997

[30] Foreign Application Priority Data

Jul. 31, 1996 [JP] Japan ..................................... 8-216924

[51] Int. Cl.[6] ...................................................... G06F 9/445
[52] U.S. Cl. .............................................................. 395/701
[58] Field of Search .................................... 395/701, 702, 395/703

[56] References Cited

U.S. PATENT DOCUMENTS

| | | | |
|---|---|---|---|
| 4,866,610 | 9/1989 | Reiners | 395/702 |
| 5,699,310 | 12/1997 | Garloff et al. | 395/701 |
| 5,809,321 | 9/1998 | Hansen et al. | 395/800.01 |
| 5,822,603 | 10/1998 | Hansen et al. | 395/800.01 |
| 5,867,662 | 2/1999 | Riggs | 709/228 |

OTHER PUBLICATIONS

Articles: Computer Select: Title: What to wear (control–flow testing), Author: Manning, Michelle M., Aug. 1997.
Article: Dr. Dobb's Journal: Title: Web–Database connectivity, Author: Z.Peter Lazar.

*Primary Examiner*—Tariq R. Hafiz
*Assistant Examiner*—Chameli C. Das
*Attorney, Agent, or Firm*—McDermott, Will & Emery

[57] ABSTRACT

The present invention provides a media flow control system, by which it is possible to describe flow of applications operated in a plurality of media and to facilitate unification of flows of each of media and preparation and change of the flows. A flow common to all media is described in a common flow definition 111, and in case it is to define different flows for each of media as not definable by the common flow, the flows are described in an individual definition for each of media using a media identifier. In case there is an individual flow definition in a flow definition 11, a flow conversion program 12 for each of media converts the common flow definition 111 and the individual flow definition 112 to flow definitions for each of media and stores them in flow definition storage units 131 to 133. The flow definitions in the flow definition storage units 131 to 133 are converted to programs for exclusive use for the media, which a generator 14 controls in each of media, and these are stored in program storage units 151 to 153 respectively.

13 Claims, 25 Drawing Sheets

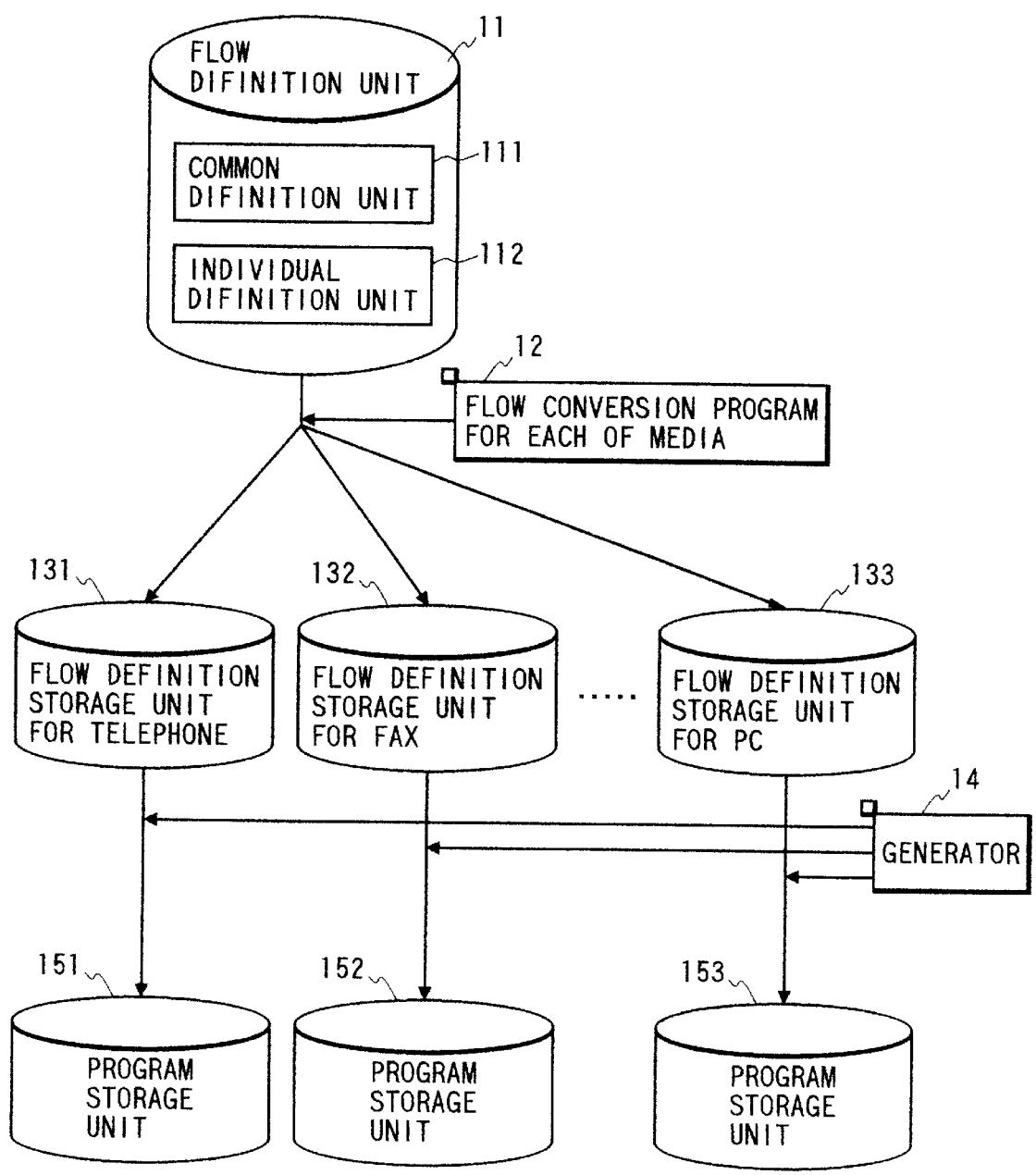

FIG. 2

```
                          <frm>
Frame definition     <name> FAPIJissekiData ; Frame name definition —201
identifier           <proc> JissekiData(data,err_num) ; Processing —202
   Processing                                                 definition
   definition
   identifier        <cond> err_num = 0 ; Flow control definition —203
      Flow control      <media> TEL                               —204
      definition
      identifier         ┌─────────────────────────────┐
       Media identifier  │   Flow for telephone        │
   Media end identifier  └─────────────────────────────┘
                         </media> TEL                             —205
                         <media> FAX                              —206
                          ┌─────────────────────────────┐
                          │   Flow for FAX              │
                          └─────────────────────────────┘
                         </media> FAX                             —207
                         <media> PC                               —208
                          ┌─────────────────────────────┐
                          │   Flow for PC               │
                          └─────────────────────────────┘
                         </media> PC                              —209
   Flow control      </cond>                                      —210
   definition end
   identifier        <cond> err_num = 1 ; Flow control definition
                         <go> FEndProcess() ; Frame transition    —211
   Flow transition   </cond>
   identifier        </frm>
```

FIG. 3

```
<frm>
    <name> FAPIJissekiData          ; Frame name definition
    <proc> JissekiData(data,err_num) ; Processing definition
    <cond> err_num = 0              ; Flow control definition
       ┌─────────────────────────────────┐
       │   Flow for telephone            │
       └─────────────────────────────────┘
    </cond>
    <cond> err_num = 1              ; Flow control definition
       <go> FEndProcess()           ; Frame transition
    </cond>
</frm>
```

FIG. 4

```
<frm>
    <name> FAPIJissekiData              ; Frame name definition
    <proc> JissekiData(data, err_num)   ; Processing definition
    <cond> err_num = 0                  ; Flow control definition
        Flow for FAX
    </cond>
    <cond> err_num = 1                  ; Flow control definition
        <go> FEndProcess()              ; Frame transition
    </cond>
</frm>
```

FIG. 5

```
<frm>
    <name> FAPIJissekiData              ; Frame name definition
    <proc> JissekiData(data, err_num)   ; Processing definition
    <cond> err_num = 0                  ; Flow control definition
        Flow for PC
    </cond>
    <cond> err_num = 1                  ; Flow control definition
        <go> FEndProcess()              ; Frame transition
    </cond>
</frm>
```

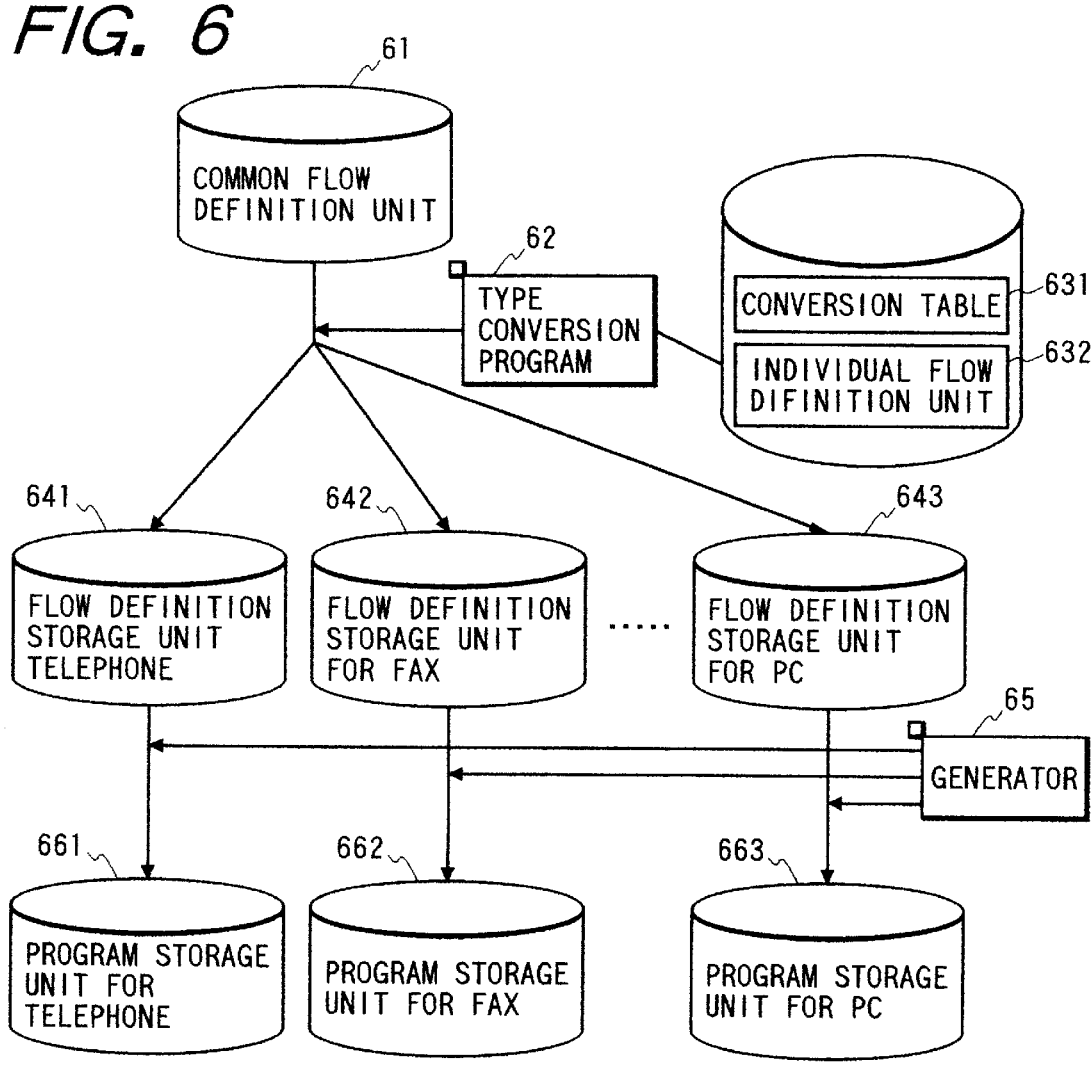

FIG. 8

```
<frm>
    <name> A
```
The following flows are described in flow definition language :
1. Display the display data for one item
2. Confirm operation to the user
3. In case the same data is to be displayed
4. In case the next data is to be displayed
5. A case not falling under 3 or 4 above

```
</frm>
```

FIG. 9

```
<frm>
    <name> B
```
The following flows are described in flow definition language :
1. Fabricate the display data in summarized form
2. Convert character image data
3. Call-cut processing

```
</frm>
```

FIG. 10

```
<frm>
    <name> C
```
The following flows are described in flow definition language :
1. Fabricate the display data in summarized form and display

```
</frm>
```

FIG. 11

```
<frm>
    <name>  FAPIJissekiData           ; Frame name definition
    <proc>  JissekiData(data, err_num); Processing definition
    <cond>  err_num = 0               ; Flow control definition
      <go>  DataDisp()        ——1101  ; Individual definition
    </cond>                             flow definition
    <cond>  err_num = 1               ; Flow control definition
      <go>  FEndProcess()             ; Frame transition
    </cond>
</frm>
```
11A

```
<frm>
    <name> DataDisp
```
> The following flows are described in flow
> definition language :
> 1. Display the display data for one item
> 2. Confirm operation to the user
> 3. In case the same data is to be displayed
> 4. In case the next data is to be displayed
> 5. A case not falling under 3 or 4 above

```
</frm>
```
11B

FIG. 13

```
<frm>
    <name>  Login

<input> InputValue(UserID)   ⎤ 1302
    <input> InputValue(Passwd)   ⎦
    <proc>  CheckPwd(UserID, Passwd, Result)  ⎤ 1303
    <cond>  Result = OK
            <go>MenuList()
    </cond>
    <cond>  Result = NG                        ⎬ 1304
            <go>Top()
    </cond>
</frm>
```

FIG. 14

File name : login.html

```
<FORM ACTION = "LoginAct">                         —141
    <INPUT TYPE = "text" NAME = "UserID">  ⎤
    <INPUT TYPE = "text" NAME = "Passwd">  ⎦ 142
    <INPUT TYPE = "submit" VALUE = "OK">
</FORM>
```

FIG. 15

File name : LoginLoad.c

```
main(int argc, char*argv[])
{
    FILE*fp ;
    char buf[256] ;

fp = fopen("Login.html") ;
    while(fread(fp, 255, 1, buf) > 0)
        printf("%s", buf) ;
    fclose(fp) ;
}
```

FIG. 16

```
File name : loginAct.c
    main(int argc, char*argv[])
    {
        char UserID[32], Passwd[32], cmd[256] ;
        shortResult ;

GetEnv(UserID, "UserID") ;       ⎤ 161
        GetEnv(Passwd, "Passwd") ;       ⎦

CheckPwd(UserID, Passwd, &Result) ; ⎤ 162
        IF(Result = = OK){
            sprintf(cmd, "MenuListLoad%s", UserID)
            system(cmd) ;
        }                                        163
        else{
            system("Top") ;
        }
    }
```

```
LIB  CheckPwd(charUserID, charPasswd);   ——1801
CMD  CheckPwd(charUserID, charPasswd);   ——1802
RPC  CheckPwd(charUserID, charPasswd);   ——1803
```

FIG. 19
```
<frm>
    <name> Login
    <proc> CheckPwd(UserID, Passwd)
</frm>
```

FIG. 20
```
main(int argc, char*argv[])
{
  charUserID[32], Passwd[32] ;
  long ret ;

CheckPwd(UserID, Passwd) ;    ——2001
}
```

FIG. 21
```
CheckPwd(UserID, Passwd)
{ return() ;
}
```

FIG. 22
```
main(int argc, char*argv[])
{
  charUserID[32], Passwd[32], cmd[256] ;

sprintf(cmd, "CheckPwd %d %s", UserID, Passwd ; ——2201
  system(cmd) ;                                    ——2202
}
```

FIG. 23
```
File name : CheckPwd.c
  main(int argc, char*argv[])
  {

}
```

```
main(int argc, char*argv[])
{
  char UserID[32], Passwd[32] ;
  long ret ;

PdfGetAgentInfo(...) ;                    — 2401
  CheckPwd(handle_t, UserID, Passwd) ;      — 2402
}
```

FIG. 27

```
TopMenu()                                              ···271
{
    push(TopMenu())  ——— 2711
    input(user_id)
    if user_id = 999
        return(TopMenu)  ——— 2712
    input(menu_id)
    if menu_id = 1
        MailLogin(user_id)
    else
        BoardLogin(user_id)
}

MailLogin(user_id)                                     ···272
{
    push(MailLogin(user_id)  ——— 2721
    input(passwd)
    if CheckPwd(user_id, passwd) = NG
        return(MailLogin)  ——— 2722
    Mail(user_id)
}

Mail(user_id)                                          ···273
{
    push(Mail(user_id))  ——— 2731
        :
    return(TopMenu)  ——— 2732
}
```

FIG. 30

```
    TopMenu()                                              ···301
    {
        GetDate( data )
3011──  OutPut (data)────30111
3012──  OutPut ("Mail  ", MailMenu())
    }          30121      30122

MailMenu()                                             ···302
    {           30211
3021── OutPut ("Login   ",
           MailLogin( usr,    pwd   ),  usr,    pwd)
    }          30212  30213a  30213b  30214a  30214b
```

FIG. 31

[TopMenu.html]                                             ···311

```
              31111
3111──  <P> %date
3112──  <A HREF="MailMenu"> Mail
                  31121       31122
```

[MailMenu1.html]                                           ···312

```
                  31211
3121──  <FORM ACTION="MailLogin">  31212a
            <INPUT TYPE="text" NAME="usr">
            <INPUT TYPE="text" NAME= "pwd">31212b
            <INPUT TYPE="submit" VALUE=" Login ">
                                            31213
```

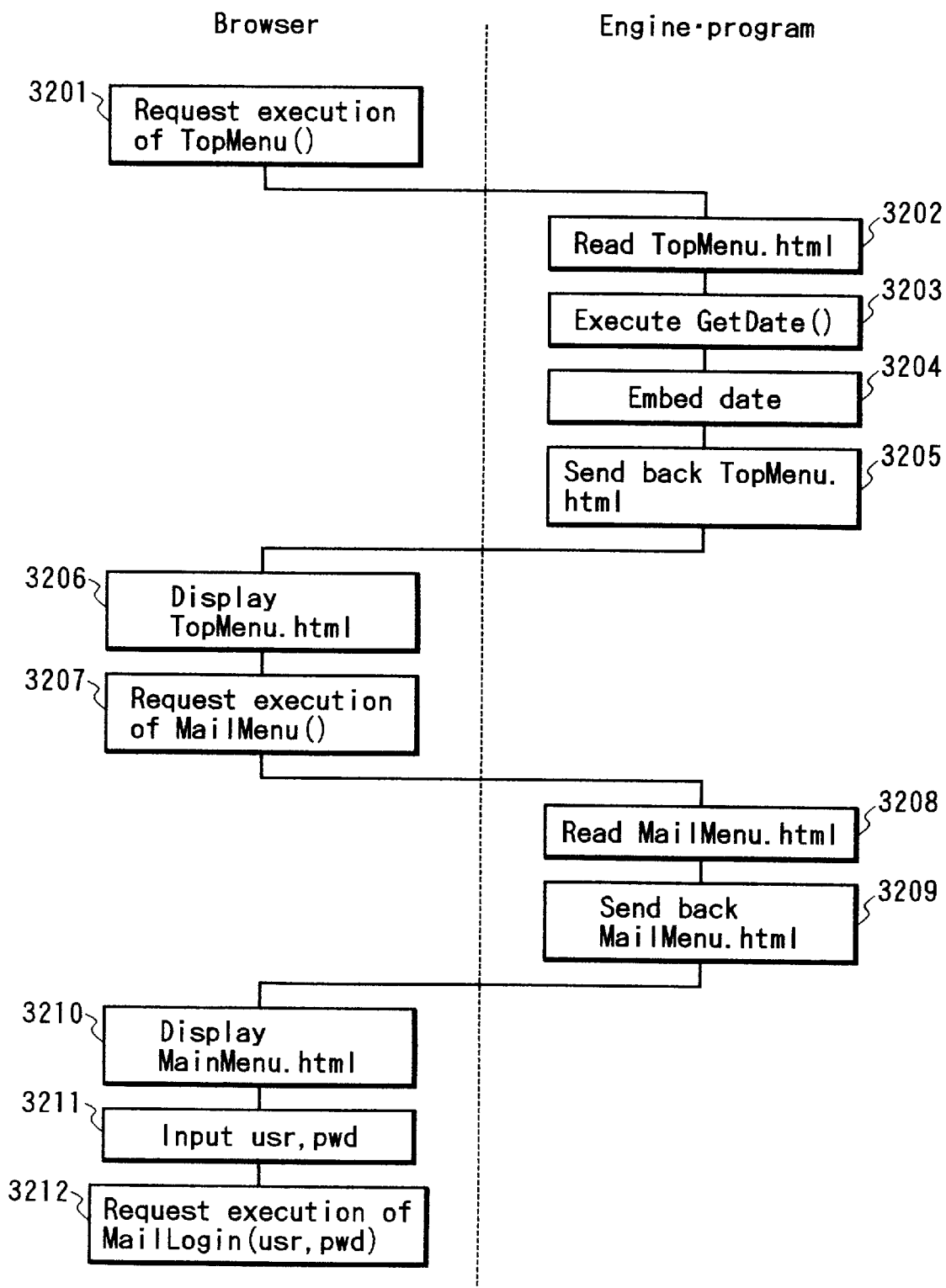

FIG. 34

```
MailMenu()                                              ···341
{                                                  3411
    Output(" Login ", MailMenu1( usr , pwd ), usr)
}

MailMenu1( usr, pwd )                                   ···342
{                                                  3421
    Output(" Login ", MailLogin( usr, pwd ), pwd)
}
```

FIG. 35

[MailMenu.html]                                         ···351

```
    <FORM ACTION= "MailMenu1">  3511
        <INPUT TYPE= "text" NAME= "usr">
        <INPUT TYPE= "submit" VALUE= " Login ">
```

[MailMenu1.html]                                        ···352

```
    <FORM ACTION= "MailLogin">
        <INPUT TYPE= "HIDDEN" NAME= "usr" VALUE= "%usr">
        <INPUT TYPE= "text" NAME= "pwd">3521
        <INPUT TYPE= "submit" VALUE= " Login ">
```

FIG. 38

```
MailLogin(usr, pwd) [Func]_                          ···381
{                          ~3811
    ret = CheckPwd(usr, pwd)
    it(ret = = OK)
        Mail(usr)
    else
        TopMenu()
}

Mail(usr)                                            ···382
{
    num = GetMailNum(usr)
    for(cnt = 0 ; cnt < num ; + +cnt) {
3821——  LoopStart("MailList")
        GotMailHead(usr, cnt, from, subject)
3822——  Output(from + " ; " + subject, MRoad(usr, cnt))
3823——  LoopEnd("MailList")
    }
}
```

FIG. 39

```
[Mail.html]                                          ···391
3911—— <!-- LoopStart("MailList") -->
3912—— <A HREF = "MRead?usr = %usr&pwd = %pwd">%from ; %subject
3933—— <!-- LoopEnd("MailList") -->
```

MEDIA FLOW CONTROL SYSTEM

BACKGROUND OF THE INVENTION

1. Field of the Invention

The present invention relates to a flow control system of applications operated on a plurality of media, and in particular to a media flow control system, by which it is possible to achieve description of flow of applications on a plurality of media without being conscious of types of media.

2. Description of the Related Art

In the past, in case various types of communication media such as telephone, facsimile, CAPTAIN terminal, personal computer, information portable terminal, etc. connected to electronic computer are utilized as data input/output terminal, a flow control system of applications corresponding to these communication media has been used, and the flow control system is managed and operated for each application corresponding to the communication media.

However, in the conventional type flow control system of applications, there have been the following problems:

(1) An application to correspond to each of the communication media is to be prepared, and flow is different for each of the media.

(2) In case the flow of application once prepared is to be changed, it is necessary to change program for each of the media, and much labor and time are required for the change.

(3) Because picture (screen) design information is included in program in the flow control system of personal computer, it is not very easy to perform picture design editing.

SUMMARY OF THE INVENTION

To solve the above problems, the media flow control system according to the present invention comprises a flow definition unit for defining a common flow definition to define flow of the entire application and an individual flow definition to individually define different flow for each of media, a flow converting program for converting the common flow definition unit to flow definition for each of media and for storing it in a flow definition storage unit for each of media, a generator for automatically generating a special-purpose program for each of media to perform input or display of each of media from the flow of the flow definition unit of each of media, and a program storage unit for storing the automatically generated program, whereby it is possible to describe the flow, which is common to a plurality of media on the common flow definition unit.

According to the present invention, it is possible to achieve description of flow of applications in a plurality of media without being conscious of types of media.

According to the invention of claim 1 of the present application, there are provided a flow definition unit for collectively defining a common flow definition to define flow of the entire application and an individual flow definition to individually define different flows for each of media, a flow converting program for each of media for converting the flow definition unit to flow definition for each of media and for storing it to a flow definition storage unit for each of media, a generator for automatically generating a special-purpose program for each of media to control input and display of each of media from the flow of the flow definition unit for each of media, and a program storage unit for storing the automatically generated program, whereby the flow definition unit can describe the flow common to a plurality of media. With such arrangement, it is possible to easily describe the common flow not dependent on media and to improve program development efficiency because there is no need to develop each special-purpose program by media.

According to the invention of claim 2 of the present application, there are provided a common flow definition unit for defining flow of the entire application, an individual flow definition unit for defining standard flow for each of media, a conversion table for maintaining corresponding information for mapping flow type to describe in the common flow definition unit and flow type in the individual flow definition unit, a type conversion program for converting the common flow definition unit to flow definition for each of media by referring the conversion table and the individual flow definition unit and for storing it to a flow definition storage unit for each of media, a generator for automatically generating a special-purpose program for each of media to control input and display of each of media from the flow definition, and a program storage unit for storing the automatically generated program, whereby the common flow definition unit is converted to flow definition for each of media by referring to the conversion table and the individual flow definition unit. With the above arrangement, it is possible to define standard flow with high frequency to use in the individual flow defining unit in addition to the operation obtained in claim 1 of the present application, and there is no need to repeatedly describe individual flow to the common flow definition.

The invention of claim 3 of the present application provides a media flow control system as described in claim 2, wherein there are provided, instead of the generator of claim 2 for generating a special-purpose program for each of media, a generator for generating an engine program and a flow control program for executing markup language editable by an editor and capable to include picture design information and for processing data, and reflecting the result of data processing to the markup language, a data processing unit for storing a group of functions for processing data, an object generating unit for generating an object by linking the engine program and the flow control program with the functions in the data processing unit, and a browser for exclusive use for the media and capable to display result of execution of the object generated by the markup language and the object generating unit, whereby the picture layout information is separated from the engine program and the flow control program, and it is possible to easily edit by modifying the markup language.

The invention of claim 4 of the present application provides a media flow control system as described in claim 3, wherein there are a plurality of types such as library, command and remote procedure call as data processing in the data processing unit, and there is provided an interface definition unit for defining interfaces for these processings and the types, and the generator can automatically generate a program, which can call the data processing to correspond to the plurality of types of processings, and the portion for data processing can generate programs not only of library type but also of command type and remote procedure call type and can cope with various types of applications.

The invention to claim 5 of the present application provides a media flow control system according to claim 4, wherein there are provided a stub preparation unit for automatically preparing a source code of a stub by referring to information in the interface definition unit and an object generating unit for generating an object by linking the flow control program automatically generated by the generator with the stub prepared by the stub preparation unit, whereby it is possible to test the prepared flow definition by utilizing the prepared stub, and to easily improve quality of the prepared flow definition.

The invention of claim 6 of the present application provides a media flow control system described in claim 5, wherein there are provided a generator for receiving the flow definition tested by utilizing the stub prepared by the stub preparation unit and the markup language and for generating an engine program and a flow control program to be operated and managed from the received flow definition, a data processing unit for storing a group of functions for processing data, an interface definition unit for defining interfaces and types for the processing, and an object generating unit for generating an object by linking the flow control program prepared by the generator with the functions for processing of the data processing unit, whereby it is possible to prevent intrusion of a program not intended by operator into a machine for operational management to prepare a flow control object.

The invention of claim 7 of the present application provides a media flow control system according to one of claims 1 to 6, wherein the language defined at the common flow definition unit and the individual flow definition unit is a non-structured language, and there is provided a call procedure storage unit for storing a procedure name of the called procedure and value of argument, and it is possible to describe that the control is brought back to the initial procedure as specified by the non-structured language, whereby the procedure can be turned to hierarchical while utilizing the advantage of the non-structured language.

The invention of claim 8 of the present application provides a media flow control system according to claim 3, wherein procedure name can be described together with information as the content to be outputted by a language defined at the common flow definition unit and the individual flow definition unit, and the markup language describing the procedure name is generated together with the information as outputted based on the defined language, whereby, by describing the processing in the defined language, it is possible to connect the markup language with the procedure and to easily achieve the media flow control system using the markup language.

The invention of claim 9 of the present application provides a media flow control system according to claim 8, wherein, in addition to the content describable by the language defined at the common flow definition unit and the individual flow definition unit, description of input argument of the procedure and argument to request input to the user among the input arguments can be specified, and the markup language is generated, which describes the procedure name and the input argument together with the information as outputted based on the defined language, whereby, in addition to the effects as obtained by the system of claim 8, it is possible to easily handle the argument by the media flow control system using the markup language.

The invention of claim 10 of the present application provides a media flow control system according to claim 9, wherein, in case there is an input argument requesting input to the user in the content of output, an engine program and the markup language are generated for each argument, whereby it is possible to prepare the engine program and the markup language to the media having only one input field.

The invention of claim 11 of the present application provides a media flow control system according to claim 3, wherein a procedure not generating the markup language can be described in a language defined at the common flow definition unit and the individual flow definition unit, and the procedure does not include output, whereby it is possible to define a procedure not containing picture layout information.

The invention of claim 12 of the present application provides a media flow control system according to one of claim 8 to 11, wherein a range to repeatedly output can be specified in the language defined at the common flow definition unit and the individual flow definition unit, and the markup language to describe the range of repeating is generated based on the defined language, whereby it is possible to describe a set of indefinite number of information in the markup language.

The invention of claim 13 of the present application provides a media flow control system according to one of claim 8 to 12, wherein there are provided means for summarizing and executing an engine program, means for summarizing the markup language to correspond to the engine program, and means for specifying the markup language to be handled as an input in individual engine program and for specifying destination of output, whereby the summarized markup language is given for input to the engine program of the foremost stage, and output of the engine program of the forward stage is turned to the markup language to handle as input in the engine program of the rear stage, and output of the engine program of the rearmost stage is handled as the markup language after the result of processing. With the above arrangement, it is possible to handle a set of the engine program and the markup language as a component and to prepare a new component by combining them, and there is no need to prepare objects one by one from the engine program to prepare a new component.

BRIEF DESCRIPTION OF THE DRAWINGS

These objects and features of the present invention will become more readily apparent from the following detailed description of the preferred embodiments taken in conjunction with the accompanying drawings in which:

FIG. 1 is a drawing to represent a media flow control system in a first embodiment of the present invention;

FIG. 2 represents a common flow definition unit of the first embodiment of the invention;

FIG. 3 represents a flow definition for telephone in the first embodiment of the invention;

FIG. 4 represents a flow definition for facsimile in the first embodiment of the invention;

FIG. 5 represents a flow definition for personal computer in the first embodiment of the invention;

FIG. 6 shows a media flow control system in a second embodiment of the present invention;

FIG. 7 represents a common flow definition unit in the second embodiment of the invention;

FIG. 8 represents a first individual flow definition unit in the second embodiment of the invention;

FIG. 9 represents a second individual flow definition unit in the second embodiment of the invention;

FIG. 10 represents a third individual flow definition unit in the second embodiment of the invention;

FIG. 11 represents a flow definition for telephone in the second embodiment of the invention;

FIG. 13 represents a common flow definition unit in the third embodiment of the present invention;

FIG. 14 represents a markup language in the third embodiment of the invention;

FIG. 15 shows an engine program in the third embodiment of the invention;

FIG. 16 shows a flow control program in the third embodiment of the invention;

FIG. 19 represents a flow definition unit in the fourth embodiment of the present invention;

FIG. 20 represents call of library function in the fourth embodiment of the invention;

FIG. 21 represents a stub in the library function in the fourth embodiment of the invention;

FIG. 22 represents a command call in the fourth embodiment of the invention;

FIG. 23 represents a stub of a command in the fourth embodiment of the present invention;

FIG. 27 represents a flow definition in the sixth embodiment of the invention;

FIG. 30 represents a flow definition in the seventh embodiment of the invention;

FIG. 31 shows a markup language prepared in the media flow control system in the seventh embodiment of the invention;

FIG. 32 is a flow chart of a program prepared in the media flow control system in the seventh embodiment of the invention;

FIG. 34 represents a flow definition in the eighth embodiment of the invention;

FIG. 35 shows a markup language prepared in the media flow control system in the eighth embodiment of the invention;

FIG. 38 represents a flow definition in the ninth embodiment of the invention;

FIG. 39 shows a markup language prepared in the media flow control system in the ninth embodiment of the invention;

DETAILED DESCRIPTION OF THE INVENTION

Figure 12:
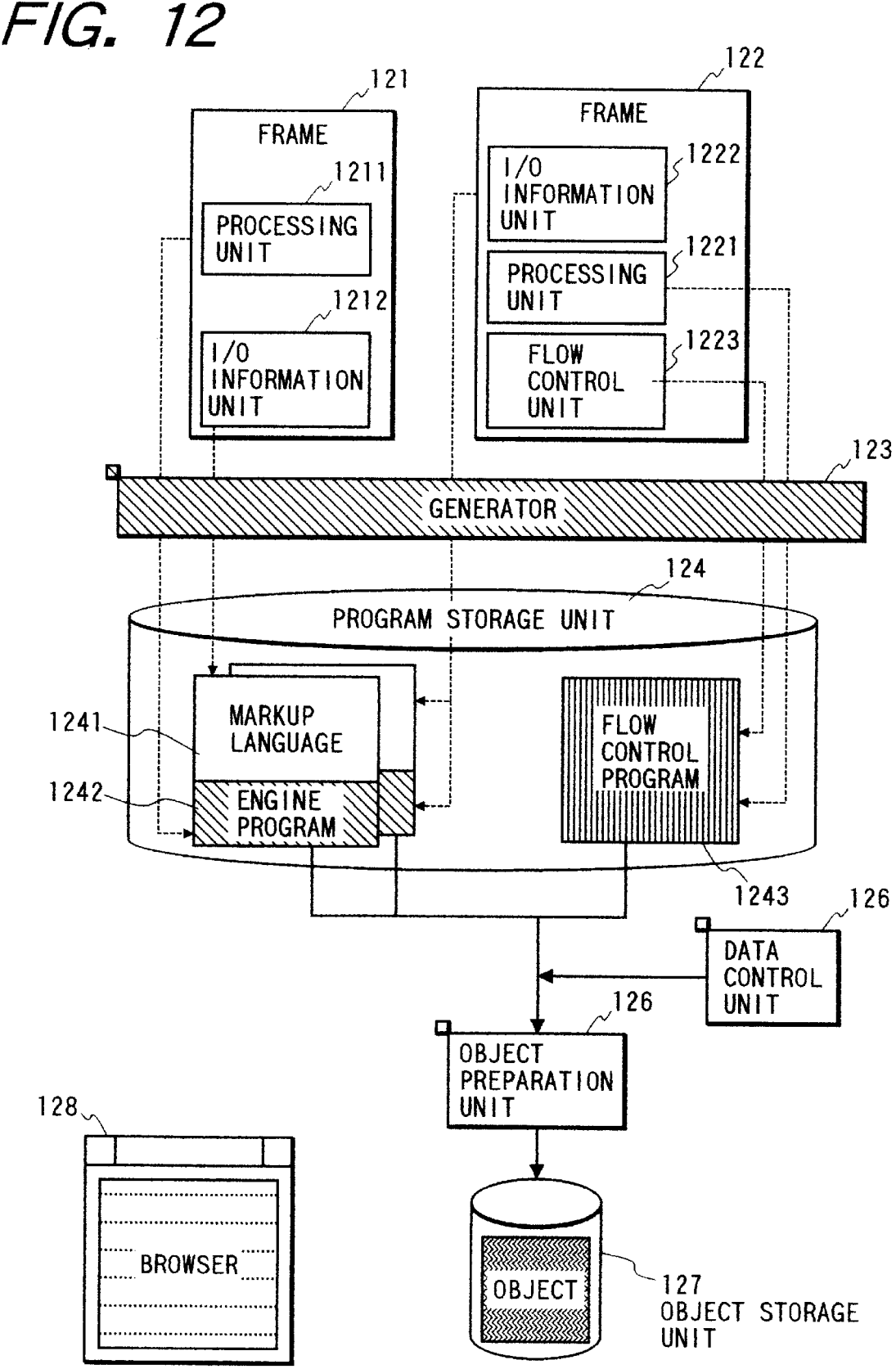
FIG. 12 shows a media flow control system in a third embodiment of the present invention.

In the following, description will be given on embodiments of the present invention referring to the attached drawings.

(1st Embodiment)

FIG. 1 represents a block diagram of a media flow control system in a first embodiment of the present invention. The media flow control system comprises a flow definition unit 11 containing a common flow definition 111 and an individual flow definition 112, a flow conversion program 12 for each of media, flow definition storage units 131, 132 and 133 for each of the media, a generator 14, and program storage units 151, 152 and 153 for each of the media.

In the flow definition unit 11, flow of applications such as sequence of data input, designation of processing function for execution, state transition after completion of processing, etc. are defined. In case a flow common to all media is to be described, it is described by the common flow definition 111, and the individual flow definition 112 is to define flows, which are different for each of the media even in case the same processing is performed, as not being defined by common flow, using a media identifier for each of the media.

In case it is defined that the individual flow definition 112 is included in the flow definition unit 11, the flow conversion program 12 for each of the media converts the common flow definition 11 and the individual flow definition 112 to the flow definition for each of the media and these are stored in the flow definition storage units 131, 132 and 133. The flow definitions in the flow definition storage units 131, 132 and 133 are converted to a program for exclusive use of the media which the generator 14 controls in each of the media, and these are stored in the program storage units 151, 152 and 153.

FIG. 2 shows a concrete example of the flow definition unit 11. A portion from <frm> to </frm> is called a frame, and it comprises a frame identifier for identifying the frame, 0 or more output information identifiers for identifying output information of data, 0 or more input information identifiers for identifying input information of data, 0 or more processing definition identifiers for specifying library functions present in the data processing unit or functions for processing remote procedure call or API, 0 or more frame transition identifiers for specifying the frame in transition in case it is shifted to the other frame, 0 or more flow control definition identifiers for describing the next processing, and 0 or more media identifiers for identifying the flow control portion peculiar to media.

The frame of the common flow definition unit shown in FIG. 2 is named as FAPIJissekiData by the frame identifier <name> at 201. In this frame, function name and argument for performing processing are specified using a processing definition identifier <proc> at 202. The portion enclosed by a flow control definition identifier <cond> and a flow control definition end identifier </cond> is the portion where flow control definition is performed. If the result of processing at 202 agrees with the condition described immediately after the flow control definition identifier 203, processing up to immediately before the flow control definition end identifier </cond> is executed. In the present example, the flow from 204 to 209 is executed in case err num variable is 0.

The portion enclosed by a media identifier <media> and a media end identifier </media> is a portion where the flow peculiar to the media can be defined. The flow peculiar to the media includes what can be summarized and displayed just as personal computer or portable information terminal depending on the property of the media to be displayed in case one or more data are to be displayed, or what can be summarized and displayed using a medium such as paper as in case of facsimile, or data are not displayed in summary but are displayed one by one as in case of telephone, and the flow is different in each case. The flow for telephone is defined between 204 and 205, a flow for facsimile is defined between 206 and 207, and a flow for personal computer is defined between 208 and 209, and the individual flow definition is described in the common flow definition unit. In case err num variable is 1, 211 is executed. Frame name is described next to a flow transition identifier <go>, and when 211 is executed, the state is shifted to FEndProcess frame.

Next, description will be given on a concrete example where the common flow definition unit of FIG. 2 is converted to a flow for each of the media using the flow conversion program for each of the media. FIG. 3 represents an example converted to a flow definition for telephone, FIG. 4 shows an example converted to a flow definition for facsimile, and FIG. 5 shows an example converted for personal computer. FIG. 3, FIG. 4 and FIG. 5 each represents the case where the portion defined by a media identifier is converted to a flow definition for each of the media.

(2nd Embodiment)

FIG. 6 is a block diagram of a media flow control system in a second embodiment of the invention. The media flow control system comprises a common flow definition unit 61, a type conversion program 62, a conversion table 631, an individual flow definition unit 632, flow definition storage units 641, 642 and 643 for each of the media, a generator 65, and program storage units 661, 662 and 663 for each of the media.

The common flow definition unit 61 defines flow of applications such as sequence of data input, designation of processing function to be executed, state transition after completion of processing, etc. In case the standard flow for each of the media is defined in the common flow definition unit, a type conversion identifier and a conversion type name are specified for the portion to be defined, and description of the standard flow for each of the media is defined in the individual flow definition unit 632. The type conversion program 62 generates flow definition for each of the media in the flow definition storage units 641, 642 and 643 by referring to a portion having the type conversion identifier of the common flow definition unit in the conversion table.

In the following, description will be given on a concrete example showing the flow definition for telephone 641 until it is generated. FIG. 7 shows a concrete example of the common flow definition unit. It comprises a frame identifier for identifying a frame, 0 or more output information identifiers for identifying data output information, 0 or more input information identifiers for identifying data input information, 0 or more processing definition units for specifying library function of a function for processing of remote procedure call or API, 0 or more frame transition identifiers for specifying the frame to be shifted in case shifting to the other frame is performed according to the input item or result of processing, 0 or more control definition identifiers for describing the next processing, and 0 or more type conversion identifiers for identifying conversion to the flow defined in the individual flow definition unit.

FAPIJisseki frame has a type conversion identifier <form> 701. The type conversion program 62 searches a conversion type in the conversion table 631 using a type name DataDisp subsequent to the type conversion identifier <form> as keyword. Based on the conversion table 631, the common flow definition is developed in the flow definition for each of the media. The identifiers other than the type conversion identifier <form> are the same as in the first embodiment, and detailed description is not given here.

FIG. 8, FIG. 9 and FIG. 10 each represents a concrete example of the individual flow definition unit. The individual flow definition unit 632 defines the standard flow for each of the media. In the present example, an example of A type definition is given in FIG. 8, an example of B type definition is given in FIG. 9, and an example of C type definition is given in FIG. 10. These flows include what can be summarized and displayed on display as in case of personal computer or portable information terminal according to the property of the media in case one or more data are inquired, what can be summarized and displayed using a medium such as paper as in case of facsimile, or the case where it is not displayed in summary but is displayed one by one by sound as in case of telephone, and each flow is of standard type.

Telephone is supposed to be as media in case of A type example. In the media such as telephone, in case a plurality of data are to be inquired, if the data are outputted at one time, information flows away, and it is difficult for the user to grasp the content of the data. In this respect, after the data for one item has been outputted, the next data is displayed to the user, or processing flow is defined in such manner that the user is asked to confirm whether the next data is to be displayed or the same data is to be displayed again, and the desired data is then displayed.

Facsimile is supposed to be the media in B type example. In the media such as facsimile, the medium for information display is paper, and it is more convenient for the user in this case to grasp the content of the information if the data is displayed in summary. Therefore, processing flow is defined in such manner that the data are fabricated in summary and the data are converted to character image data and are outputted.

In C type example, personal computer and portable terminal are supposed to be the media. In the media such as personal computer or portable terminal, it is possible to display in summary. Processing flow is defined in such manner that the data are fabricated in summary and displayed.

TABLE 1

| Type name | Telephone | Facsimile | Personal computer | Portable terminal |
|---|---|---|---|---|
| DataDisp (Data display type) | A type | B type | C type | C type |
| InputData (Data input type) | D type | D type | E type | E type |
| — | — | — | — | — |

Table 1 summarizes a concrete example of the conversion table 631. The row of DataDisp type represents a conversion table of data display type. The first line of this conversion table shows that the portion with description of "<form> DataDisp" in the common flow definition is converted to A type in case telephone is used as the media, to B type in case of facsimile, and to C type in case of personal computer or portable information terminal. The type conversion program 62 refers to the conversion table and generates flow definition for each of the media.

FIG. 11 represents a flow definition for telephone, which has been generated by the type conversion program 62 from the common flow definition based on the conversion table of Table 1. The items other than 1101 are the same as the frame of the common frame definition defined in FIG. 7. 1101 represents a portion converted from the portion defined as "<form> DataDisp" using the type conversion identifier at 701 of FIG. 7.

At 1101, the frame name "DataDisp" is described subsequently to the frame transition identifier <go>. The frame name "DataDisp" is named from the type name as specified at 701. This one line defines that the state is shifted to DataDisp frame. In the "DataDisp" frame 11B, the individual flow definition is prepared from A type of FIG. 8 based on the conversion table. The frame name is converted from "A" to "DataDisp".

(3rd Embodiment)

In the following, description will be given on a media flow control system of a third embodiment of the present invention referring to FIG. 12. FIG. 12 represents the case where a program for each frame is generated by the generator unlike the case where a program for each of the media is generated by the generator after generating individual flow definition as shown in FIG. 1 and FIG. 6. FIG. 12 shows frame arrangement of the flow definition unit, program arrangement of programs in frame, and arrangement of programs generated by the generator.

Frames 121 and 122 defined in the flow definition unit comprise processing units 1211 and 1221 for specifying processing, a flow control unit 1223 for controlling the flow, and I/O information units 1212 and 1222 for defining I/O information. A generator 123 analyzes definition unit of each frame and sequence of definition and determines arrangement of the programs to be generated.

There are three types of programs, which are generated by the generator 123: a markup language 1241 for embedding a tag in text and for indicating attribute, an engine program 1242 used with the markup language and provided with function to reflect data processing and the result in the markup language, and a flow control program 1243 for performing processing described in C language or Perl language.

From the I/O information units 1212 and 1222, which are component elements of the frames 121 and 122, the markup language 1241 is generated. The markup language includes picture layout information such as size of output character, size of input item, field, attribute, configuration, etc. The generator 123 generates the markup language 1241, which contains adequate picture layout information. The user can easily change the picture layout using an editor in the markup language 1241. The frame 121 delivers the result of the processing unit 1211 to the I/O information unit 1212 and outputs the results. In case of this frame, it is the flow to reflect the result of the processing unit to I/O information, and the generator 123 generates the markup language 1241 and the engine program 1242.

The frame 122 delivers the value inputted at the I/O information unit 1222 to the processing unit 1221 as argument and performs processing. The flow control unit 1223 receives the result of processing of the processing unit 1221 and performs processing. In case of input queue, user input or flow of processing execution, three types of programs are generated: the markup language 1241, the engine program 1242 and the flow control program 1243 for receiving the result of processing and performing the processing.

The engine program 1242 and the flow control program 1243 generated by the generator 123 generate an object by linking to the data processing unit 125 where functions to process data by an object processing unit 126 are stored. The generated object 127 and the markup language 1241 can receive data display or input from the user using a browser 128 prepared for each of the media.

FIG. 13 shows a concrete example of a flow definition of a frame such as the frame 122, which delivers information obtained from the I/O information unit 1222 to the processing unit 1221 and describes the flow corresponding to the result of processing in the flow definition unit 1223. The generator 123 automatically generates the markup language of FIG. 14, the engine program of FIG. 15, and the flow control program of FIG. 16 from the flow definition of FIG. 13.

The flow definition of FIG. 13 comprises an I/O information unit 1302, a processing unit 1303, and a flow control unit 1304. The portion of the I/O information unit 1302 is converted to the portion corresponding to 142 of the markup language of FIG. 14. 142 prepares text input area for inputting user name (UserID) and password (Passwd). After the input of these two values has been completed, the user specifies the name of the flow control program to be executed to 141. File name of the program is named according to the rule of "Frame name+Act". The flow control program "LoginAct" specified by 141 is shown in FIG. 16. The processing unit 1303 and the flow control definition unit 1304 convert the data to the portions corresponding to 162 and 163 respectively. Argument is received from environmental variable at 161, and the argument is delivered to the argument of function at 162, and data processing is performed.

FIG. 15 represents a source code of the engine program, which reads and executes markup language file of FIG. 14. By using this together with the engine program in pair, it is possible to place only I/O layout information to the markup language. File name of the engine program is named according to the rule of "Frame name+Load".

(4th Embodiment)

In the following, description will be given on a media flow control system of a fourth embodiment of the present invention referring to FIG. 17. In the fourth embodiment, a method to automatically generate a stub of processing function present in the data processing unit is described.

Figures 17, 18:
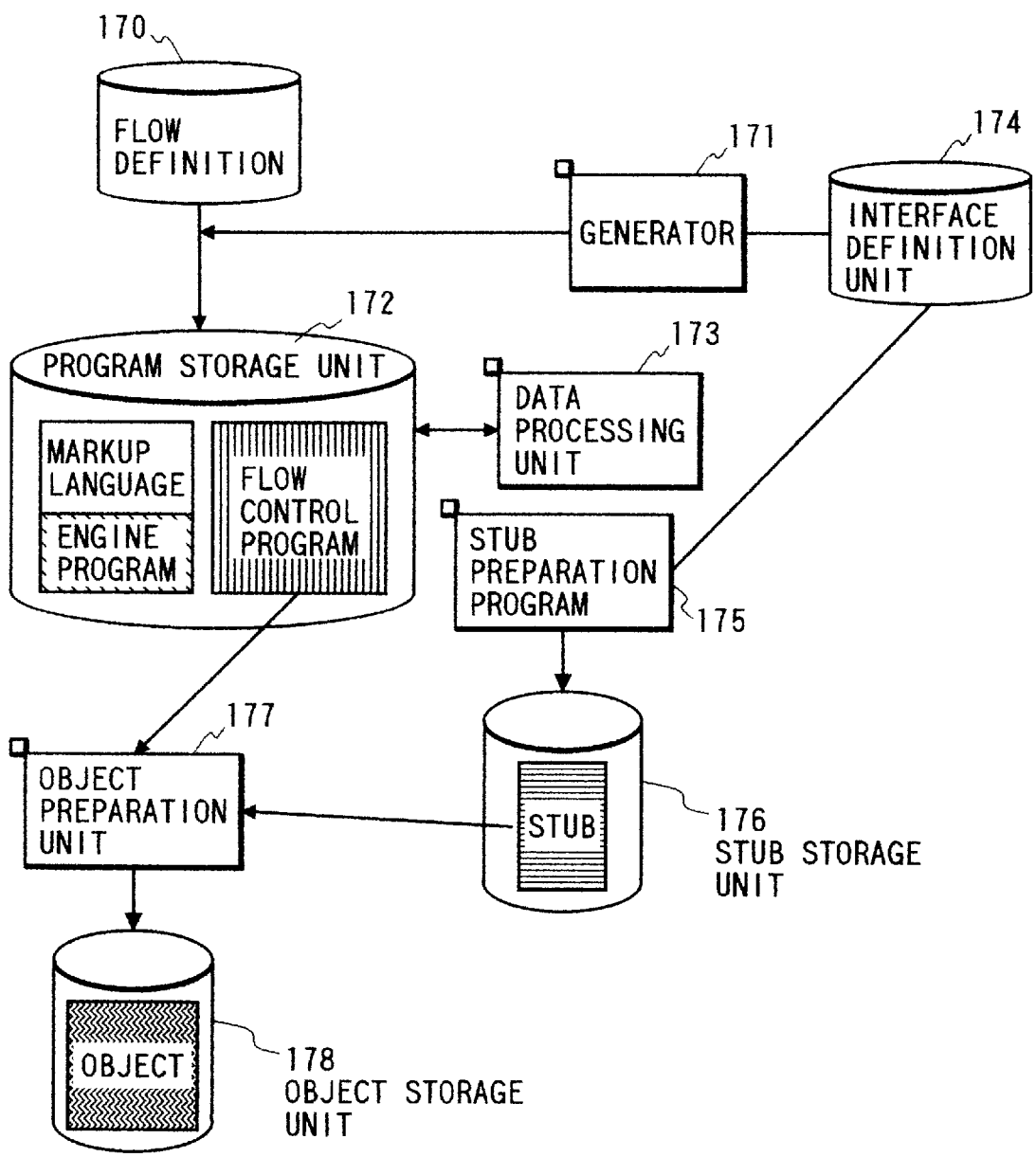
FIG. 17 shows a media flow control system in a fourth embodiment of the present invention.
FIG. 18 represents an interface definition unit in the fourth embodiment of the invention.

In FIG. 17, the media flow control system comprises a flow definition unit 170, a generator 171, a program storage unit 172 on a certain media, a data processing unit 173 for storing a group of functions to process the data, an interface definition unit 174, a stub preparation program 175, a stub storage unit 176, an object preparation unit 177, and an object storage unit 178.

The interface definition unit 174 defines a flow control program present in the data processing unit 173 and type of functions such as remote procedure call, API, etc. and function interface. The generator 171 generates a call of function complying with the type of function into the program by referring to the interface definition unit 174 and function interface of the processing unit in the flow definition, and stores it in the program storage unit 172. Also, the stub preparation program 175 prepares a stub 176 by referring to the interface definition unit 174.

FIG. 18 shows a concrete example of the interface definition unit 174.

If the processing named "CheckPwd" is a library function, a function type identifier "LIB" showing that it is a library function is put immediately before the function name as shown at 1801 and is defined. Also, argument used by the function and data type of the argument are described after the function name, and function interface is defined. Similarly, in case the processing named "CheckPwd" is a flow control object of command form, a function type identifier "CMD" as shown at 1802 is put and defined. Similarly, in case the processing named "CheckPwd" is a remote procedure call, a function type identifier "RPC" as shown at 1803 is put and defined.

FIG. 19 shows a concrete example of flow definition. FIG. 20 represents an example of a program source code generated by the generator 171 in case "CheckPwd" is a library function and definition is performed as at 1801 by the interface definition unit of FIG. 18. At 2001, function name and argument as defined in the interface definition unit of FIG. 18 are described as they are.

FIG. 21 represents a source code of a stub of the function prepared by the stub preparation program 175. Function name and argument as defined at 1801 of the interface definition unit shown in FIG. 18 are referred, and an empty function (stub) is generated in the function.

FIG. 22 represents an example of a source code generated by the generator 171 in case "CheckPwd" is an object of flow control and definition is performed as at 1802 in the interface definition unit of FIG. 18. The generator 171 generates the portion to prepare character string of object name and argument as shown at 2201 of FIG. 22 and the portion to deliver the character string prepared as at 2202 to a shell command and executes processing.

FIG. 23 represents a stub source code of "CheckPwd" and the function is empty. This source code is compiled, and an object named "CheckPwd" is prepared.

Figures 24, 25:
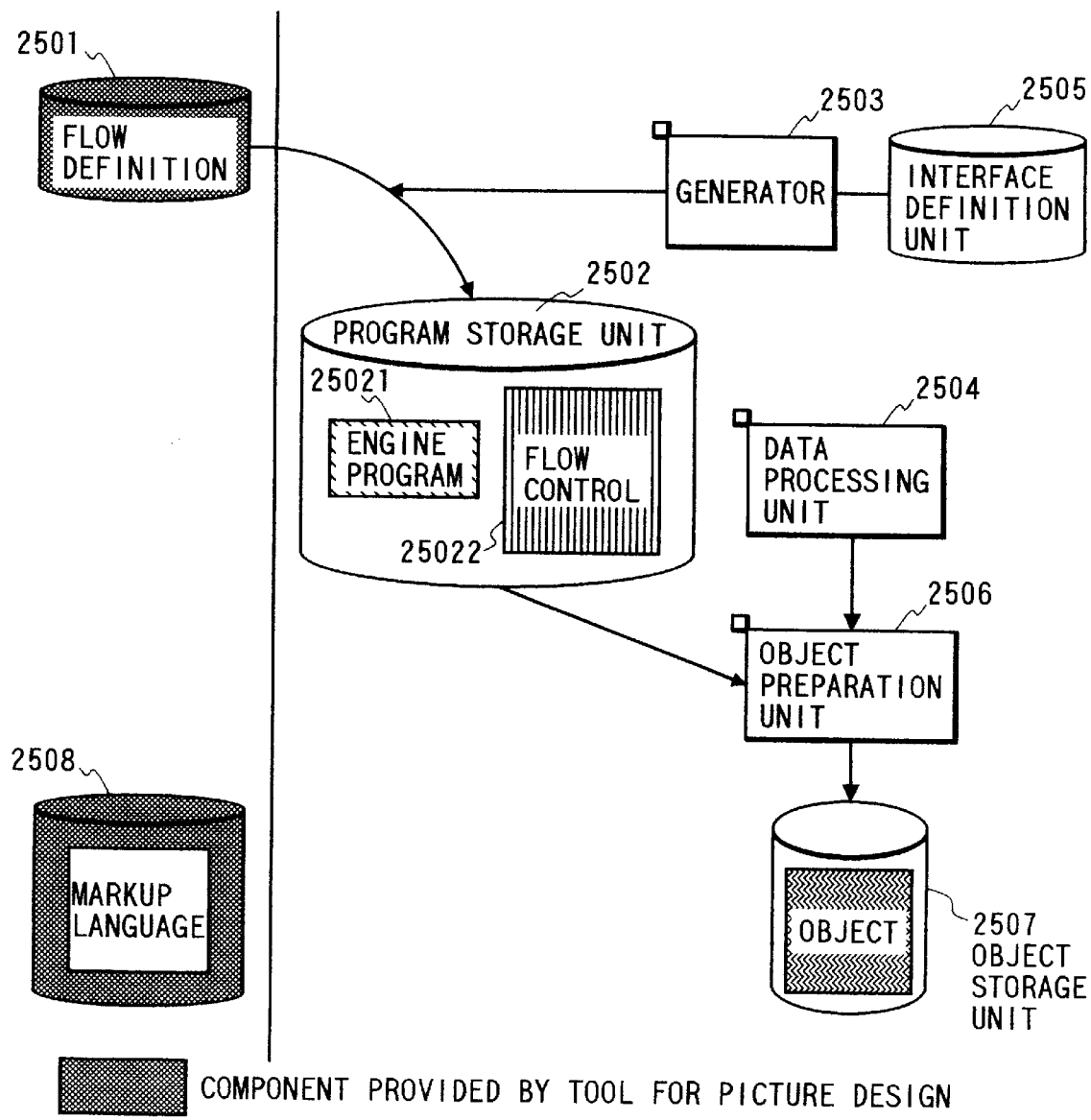
FIG. 24 represents a remote procedure call in the fourth embodiment of the invention.
FIG. 25 represents a media flow control system for operational management in a fifth embodiment of the present invention.

FIG. 24 represents an example of a program source code generated by the generator 171 in case "CheckPwd" is a remote procedure call and definition is performed as at 1803 in the interface definition unit of FIG. 18. The generator 171 generates the processing essential for call of RPC such as pre-processing necessary for calling RPC as at 2401 of FIG. 24 or placing the argument not defined in the interface definition unit to a first argument of 2402.

Each of the media has a browser to handle the same markup language and the user uses the application via the browser. For this reason, in case a new media appear in future, if they have the same property as the existing media, there is no need to perform flow definition newly, and it will suffice only to develop a browser for exclusive use of the new media.

(5th Embodiment)

In the following, description will be given on a fifth embodiment of the present invention referring to FIG. 25. In the fifth embodiment, a media flow control system where operational management can be carried out will be described.

In FIG. 25, the media flow control system comprises a flow definition 2501, a program storage unit 2502 having an engine program 25021 and a flow control program 25022, a generator 2503, a data processing unit 2504, an interface definition unit 2505, an object preparation unit 2506, an object storage unit 2507, and a markup language storage unit 2508 for storing the markup language.

Of the media flow control system, the portion capable to perform operational management (hereinafter referred as "operational management system") comprises the program storage unit 2502, the generator 2503, the data processing unit 2504, the interface definition unit 2505, the object preparation unit 2506, and the object storage unit 2507. The functions are the same as described above, and detailed description is not given here.

The operational management system receives the flow definition 2501 and the markup language 2508 tested by the stub generated using the media flow control system as explained in the fourth embodiment. As the markup language 2508, layout editing may be added.

The generator 2503 refers to the interface definition unit 2502 and generates the markup language, the flow control program 25022 and the engine program 25021 from the flow definition received, and stores them in the program storage unit 2502. The prepared markup language is not used. The object preparation unit 2506 generates an object by linking the data processing unit 2504 with the flow control program 25022 and the engine program 25021 and stores it in the object storage unit 2507.

The operational management system receives only the markup language 2508 and the flow definition 2501 from development machine of the user, and this excludes the possibility to bring the program not intended by the manager into the machine for operational management.

(6th Embodiment)

Figure 26:
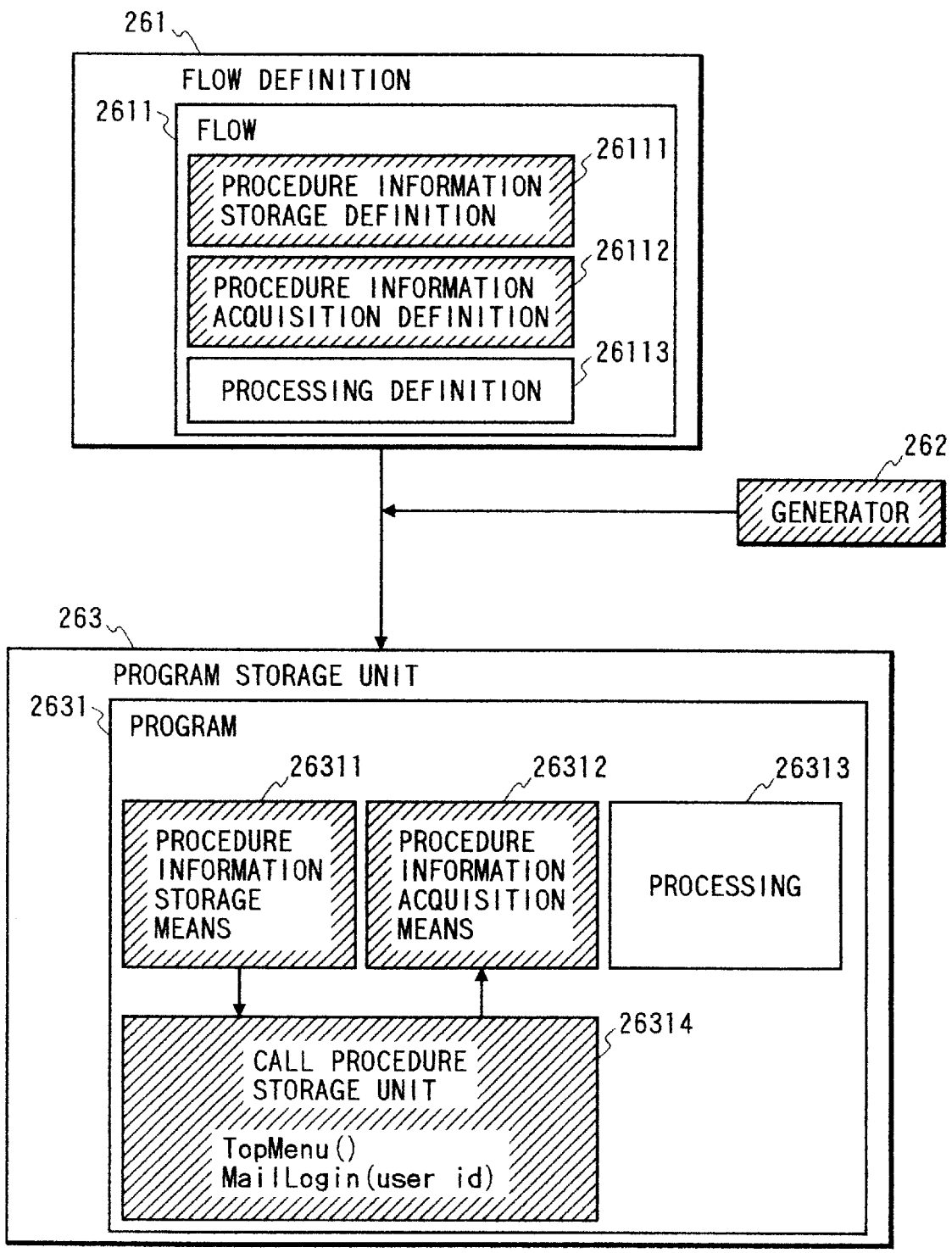
FIG. 26 shows a media flow control system in a sixth embodiment of the present invention.

In the following, description will be given on a media flow control system of a sixth embodiment of the present invention referring to FIG. 26. FIG. 26 represents major arrangement of the media flow control system, and it primarily comprises a flow definition unit 261 where a flow definition 2611 contains a procedure information storage definition 26111, a procedure information acquisition definition 26112, and a processing definition 26113, a generator 262, and a program storage unit 263 for storing a program to contain a procedure information storage means 26311, a procedure information acquisition means 26312, a processing 26313, and a call procedure storage unit 26314 in the program 2631. The other components such as object storage unit are not shown.

The generator 262 generates the program 2631 from the flow definition 2611. The procedure information storage definition 26111 and the procedure information acquisition definition 26112 in the flow definition 2611 are converted to the procedure information storage means 26311 and the procedure information acquisition means 26312 in the program 2631. Also, the call procedure storage unit 26314 is present in the program 2631.

Figure 28:
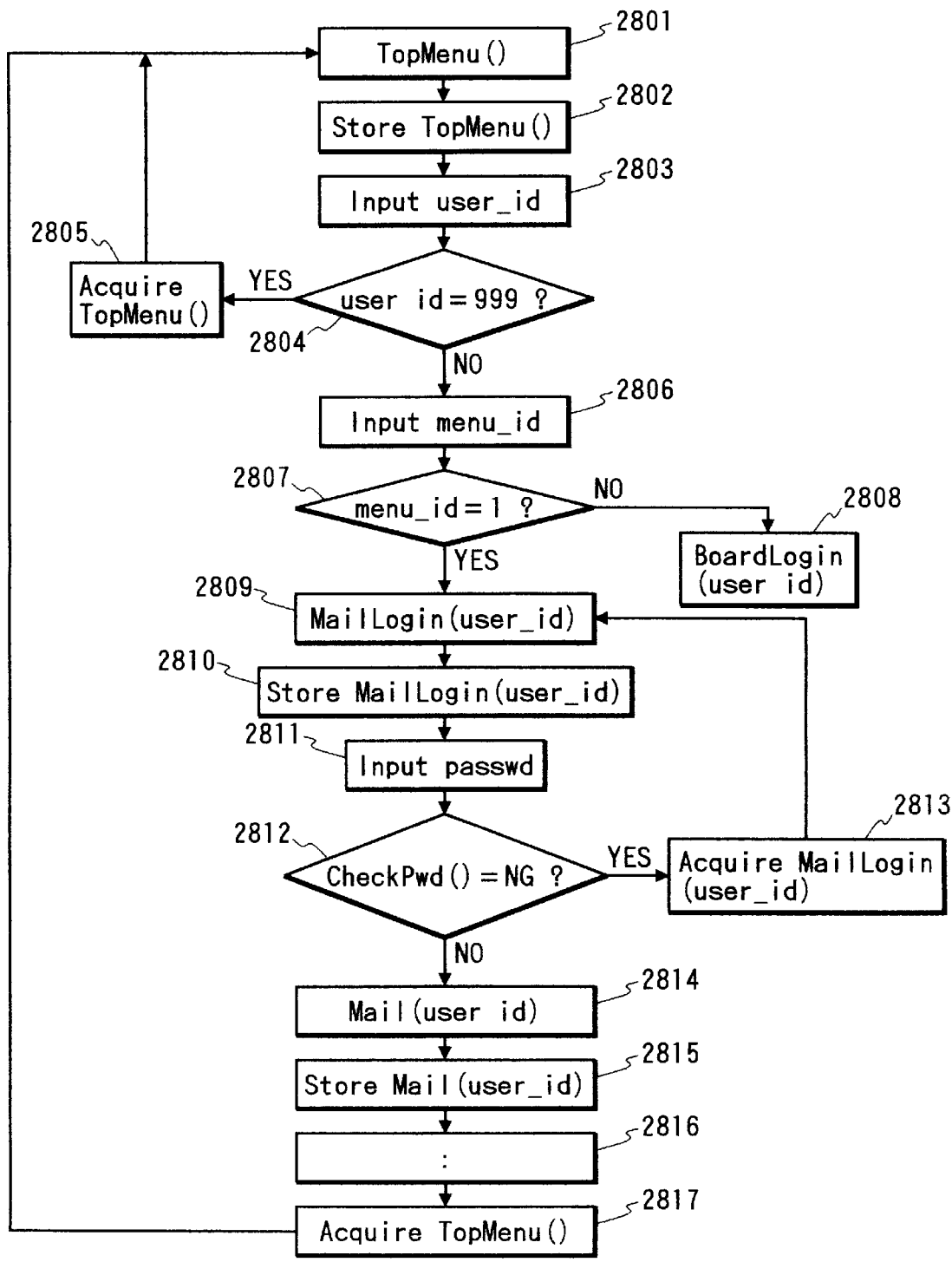
FIG. 28 represents a flow chart of a program prepared in the media flow control system of the sixth embodiment of the invention.

Description will be given now on operation of the prepared program referring to FIG. 27 and FIG. 28. FIG. 27 represents the flow definition, and it comprises modules such as TopMenu() 271, MailLogin() 272, and Mail() 273. push(TopMenu()) 2711, push(MailLogin(user id)) 2721, and push(Mail(user id)) 2731 are the procedure information storage definition 26111 of FIG. 26. return(TopMenu) 2712, return(MailLogin) 2722, and return(TopMenu) 2732 are the procedure information acquisition definition 26112 of FIG. 26.

Processing procedure of the flow definition will be described below using a flow chart shown in FIG. 28.

When TopMenu() (Step 2801) is executed, ropMenu() is stored in the call procedure storage unit 26314 in Step 2802.

In Step 2803, user id is inputted, and it is judged whether user id is 999 or not. If user id is 999, TopMenu() is acquired from the call procedure storage unit 26314 (Step 2805), and TopMenu() is executed (Step 2801).

If user id is not 999, menu id is inputted in Step 2806, and it is judged whether menu id is 1 or not (Step 2807). In case menu id is not 1, BoardLogin(user id) is executed in Step 2808.

In case menu id is 1, MailLogin(user id) is executed in Step 2809, and MailLogin(user id) is stored in the call procedure storage unit 26314 (Step 2810). In this case, TopMenu() and MailLogin(user id) are stored in the call procedure storage unit 26314.

In Step 2811, passwd is inputted, and CheckPwd() is executed, and it is judged whether the result is NG or not (Step 2812). In case the result of CheckPwd() is NG, MailLogin(user id) is acquired from the call procedure storage unit 26314 (Step 2813), and MailLogin(user id) is executed (Step 2809). In this case, TopMenu() is stored in the call procedure storage unit 26314.

In case the result of CheckPwd() is not NG, Mail(user id) is executed in Step 2814, and Mail(user id) is stored in the call procedure storage unit 26314 (Step 2815). In this case, TopMenu(), MailLogin(user id) and Mail(user id) are stored in the call procedure storage unit 26314.

In Step 2816, any execution is performed, and TopMenu() is acquired from the call procedure storage unit 26314 (Step 2817), and TopMenu() is executed (Step 2801). In this case, the call procedure storage unit 26314 is empty. In this way, it is possible to turn the procedure to hierarchical, utilizing advantage of non-structured language in the sixth embodiment.

(7th Embodiment)

Figure 29:
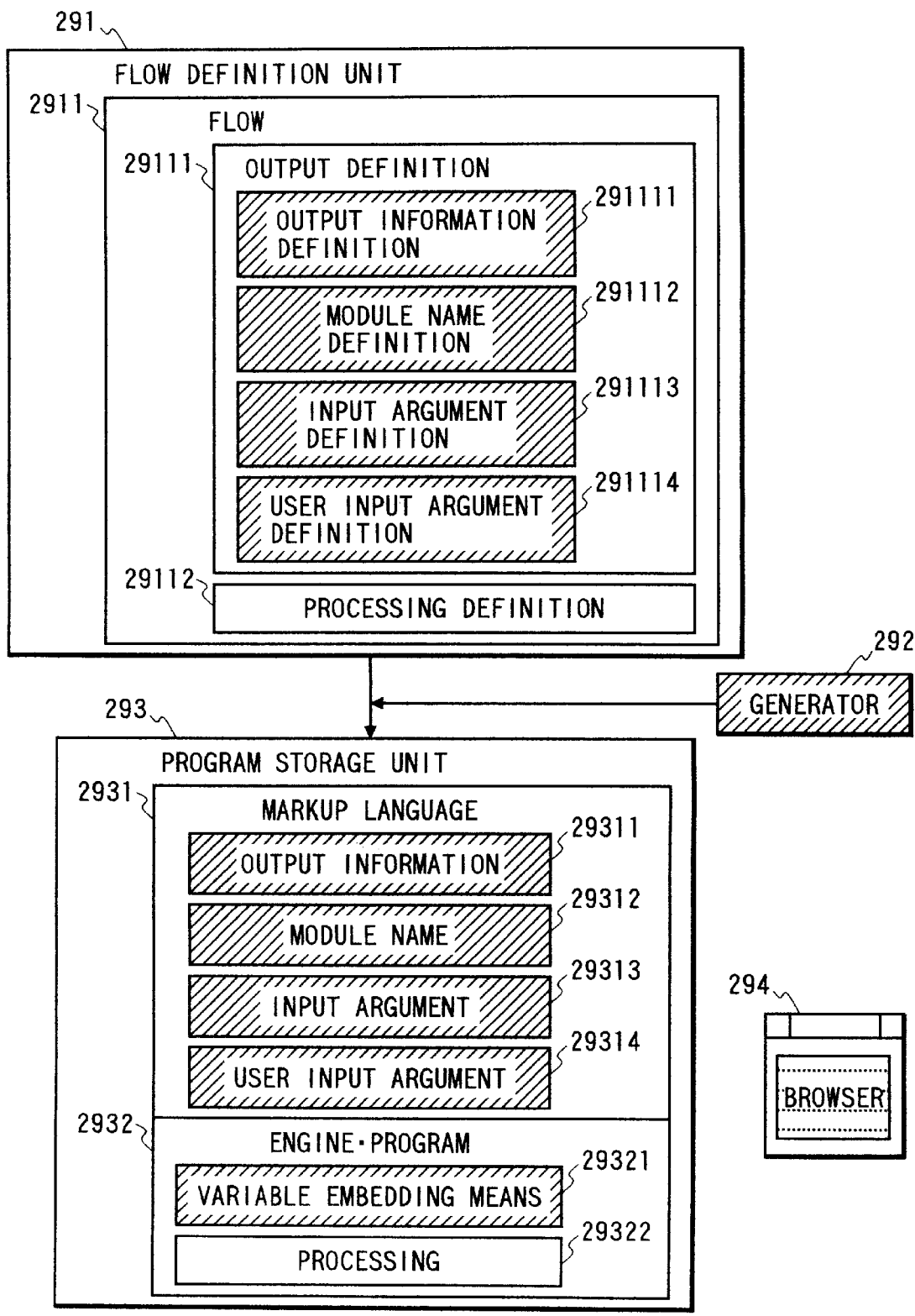
FIG. 29 shows a media flow control system in a seventh embodiment of the present invention.

In the following, description will be given on a media flow control system of a seventh embodiment of the present invention referring to FIG. 29. FIG. 29 shows major arrangement of the media flow control system, and it primarily comprises a flow definition unit 291 where a flow definition 2911 contains an output information definition 29111, having an output definition 291111, a module name definition 291112, an input argument definition 291113, and a user input argument definition 291114, and a processing definition 29112, a generator 292, a program storage unit 293 for storing a markup language 2931 containing an output information 29311, a module name 29312, an input argument 29313, and a user input argument 29314, and an engine program 2931 containing a variable embedding means 29321 for embedding value of variable into the markup language and a processing 29322, and a browser 294. The other components such as object storage unit are not shown. The generator 292 generates the markup language 2931 and the engine program 2932 from the flow definition 2911.

The output information definition 291111, the module name definition 291112, the input argument definition 291113, and the user input argument definition 291114 in the flow definition 2911 are converted to the output information 29311, the module name definition 29312, the input argument definition 29313, and the user input argument definition 29314 in the markup language 2931.

Description will be given now on operation of the prepared program referring to FIG. 30, FIG. 31, and FIG. 32. FIG. 30 represents the flow definition, which comprises modules of TopMenu() 301 and MailMenu() 302. Output() at 3011, 3012 and 3021 represents the output definition 291111 of FIG. 29. Date 30111 and "mail" 30121 and "login" 30211 represents the output information definition 291111 of FIG. 29, MailMenu() 30122 and MailLogin() 30212 represents the module name definition 291112 of FIG. 29, usr 30213*a* and pwd 30213*b* represent the input argument definition 291113 of FIG. 29, and usr 30214*a* and pwd 30214*b* represent the user input argument definition 291114 of FIG. 29.

FIG. 31 represents the markup language prepared from the flow definition of FIG. 30. <P> . . . 3111, <A . . .> 3112 and <FORM . . .> 3121 represent information converted from OutPut() of 3011, 3012, and 3021 respectively, %date 31111, "mail" 31122 and Login 31213 represent output information converted from date 30111, "mail" 30121 and "Login" 30211 respectively. MailMenu 31121 and MailLogin 31121 represent module names converted from MailMenu() 30122 and MailLogin() 30212 respectively, and usr 31212*a* and pwd 31212*b* represent input arguments which are inputted by the user converted from usr 30213*a*, pwd 30213*b*, usr 30214*a* and pwd 30214*b*.

Description will be given now on processing procedure of the flow definition referring to the flow chart of FIG. 32. When execution request of TopMenu() is carried out by the browser 294 (Step 3201), TopMenu.html 311 is read by the engine program 2932 (Step 3202). GetDate() is executed (Step 3203), and date is acquired. To %date of TopMenu-.html read by the variable embedding means 29321, the date acquired in Step 3203 is placed (Step 3204), and TopMenu-.html is sent back to the browser 294 (Step 3205).

The browser 294 displays TopMenu.html (Step 3206). When execution request of MailMenu() is performed in Step 3207, MailMenu.html 312 is read by the engine program 2932 (Step 3208), and it is sent back to the browser 294 (Step 3209).

The browser 294 displays MailMenu.html (Step 3210). In Step 3211, usr and pwd are inputted, and execution request of MailLogin (usr, pwd) is performed (Step 3212). As described above, it is possible to connect the markup language with the procedure in the seventh embodiment, and the media flow control system using the markup language can be easily achieved. Also, argument can be easily handled by the media flow control system using the markup language.

(8th Embodiment)

Figure 33:
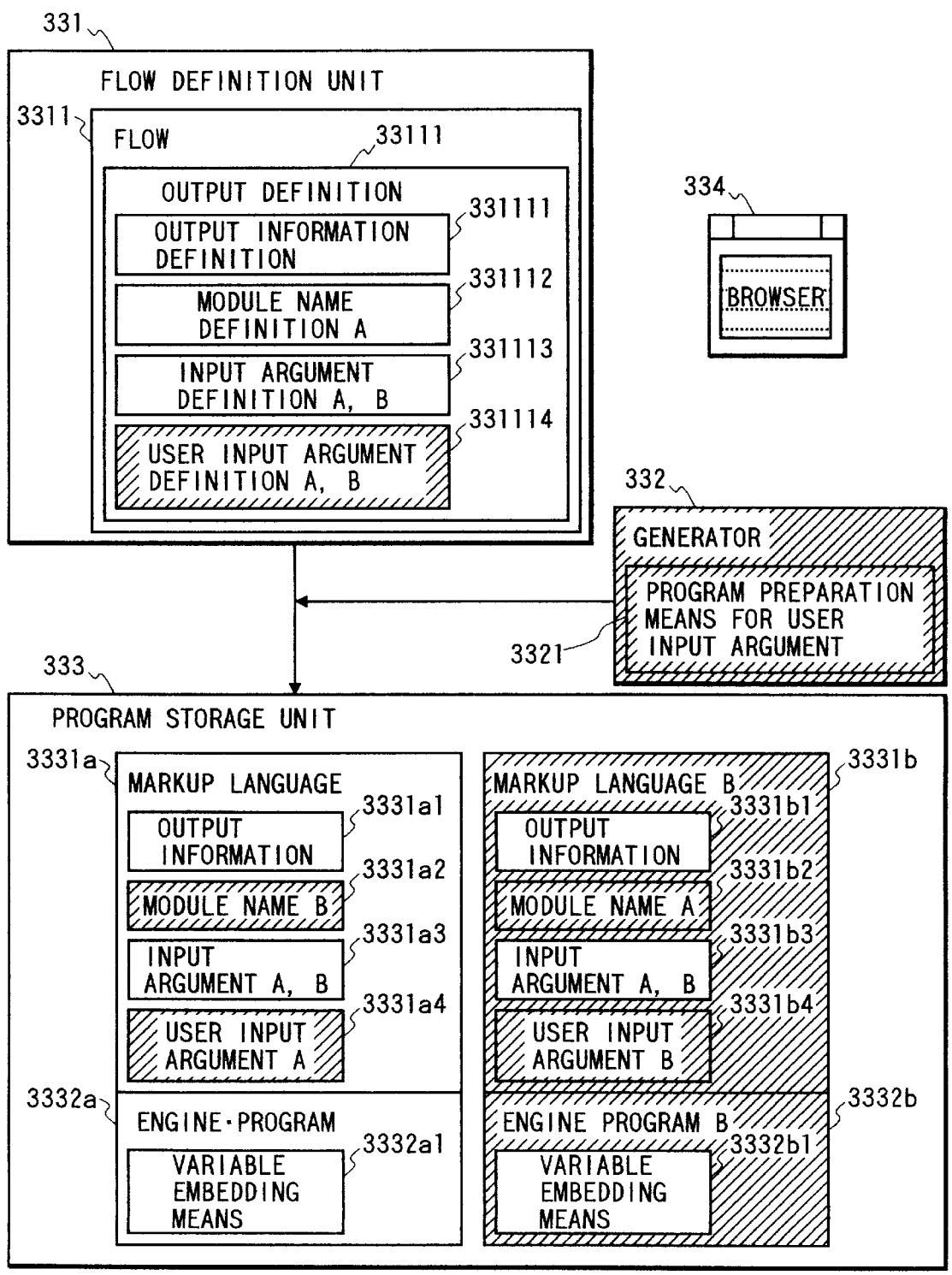
FIG. 33 shows a media flow control system in an eighth embodiment of the present invention.

In the following, description will be given on a media flow control system of an eighth embodiment of the present invention referring to FIG. 33. FIG. 33 shows major arrangement of the media flow control system, and it primarily comprises a flow definition unit 331 where an output definition 33111 has a flow definition 3311 which contains an output information definition 331111, a module name definition 331112, an input argument definition 331113 and a user input argument definition 331114, a generator 332, a program preparation means 3321 for each user input argument, a program storage unit 333 for storing a combination of a markup language 3331*a*, containing an output information 3331*a*1, a module name 3331*a*2, an input argument 3331*a*3 and a user input argument 3331*a*4, with an engine program 3332*a* having variable embedding means 3332*a*1 to embed variable value to the markup language, and also storing a combination of a markup language 3331*b*, having an output information 13331*b*1, a module name 3331*b*2, an input argument 3331*b*3, and a user input argument 3331*b*4, with an engine program 3332*b* having variable embedding means 3332*b*1 to embed variable value to the markup language, and a browser 334. The other components such as an object storage unit are not shown in the figure.

The generator 332 generates markup languages 3331*a* and 3331*b* and engine programs 3332*a* and 3332*b*. When a plurality of arguments are defined in the user input argument definition 331114 (A and B in this case), the program preparing means 3321 for each user input argument prepares a markup language and an engine program each having a user input argument.

The output information definition 331111 in the flow definition 3311 is converted to output informations 3331*a*1 and 3331*b*1 of the markup languages 3331*a* and 3331*b*. The module name definition 331112 is converted to a module name 3331*b*2 of the markup languages 3331*a* and 3331*b*, and the input argument definition 331113 is converted to input arguments 3331*a*3 and 3331*b*3 of the markup languages 3331*a* and 3331*b*.

To the module name 3331*a*2 of the markup language 3331*a*, a module name corresponding to the engine program 3332*b* generated by the program preparing means 3321 for each user input argument is entered. A and B are entered to the user input argument 3331*a*4 and 3331*b*4 respectively.

Figure 36:
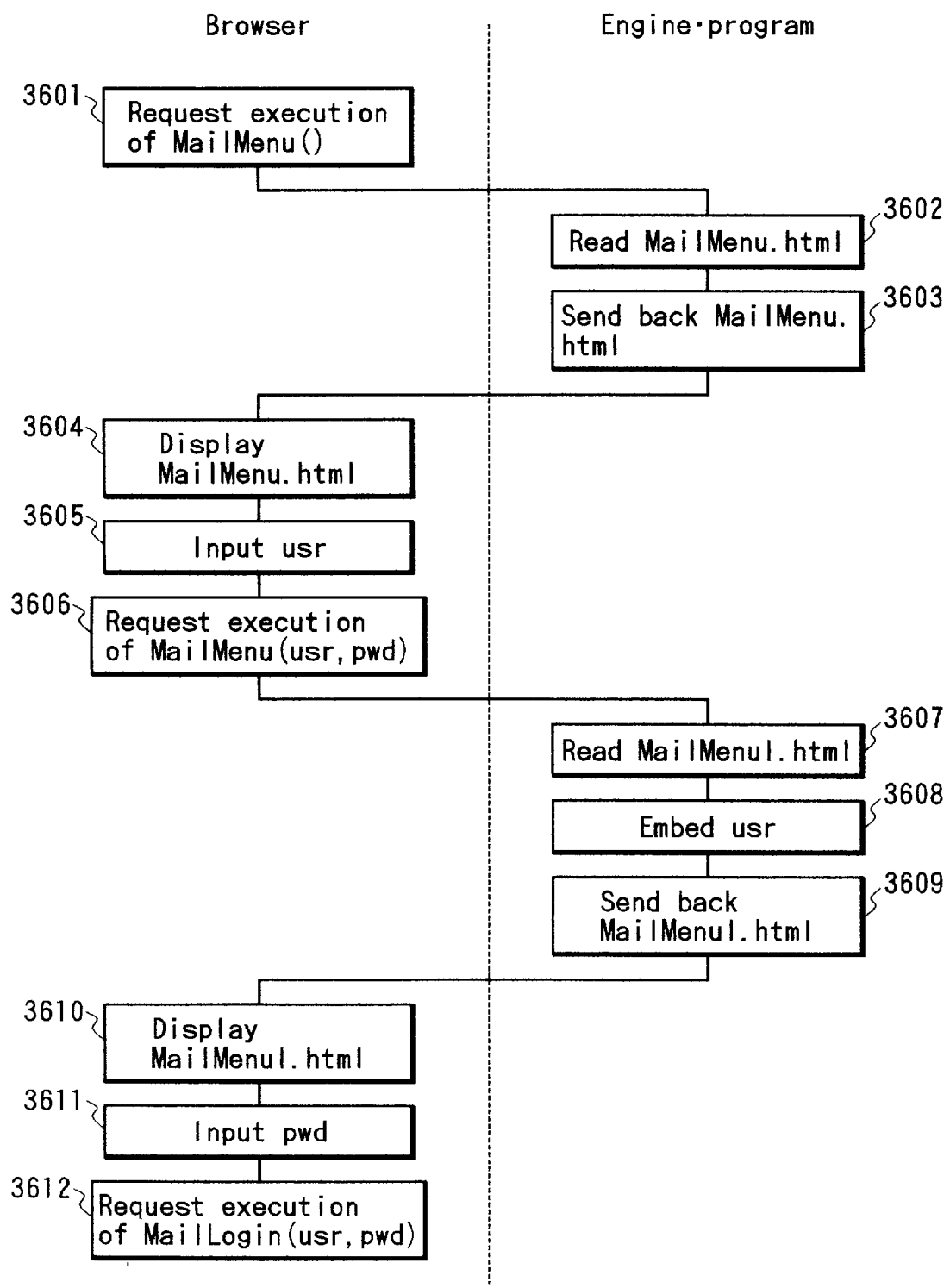
FIG. 36 is a flow chart of a program prepared in the media flow control system in the eighth embodiment of the invention.

Description will be given below on operation of the prepared program referring to FIG. 34, FIG. 35 and FIG. 36. FIG. 34 represents a flow prepared from MailMenu() of the flow definition of FIG. 30 and represents a flow definition to the media having only one input field, and it comprises modules of MailMenu() 341 and MailMenu() 342. usr 3411 and pwd 3421 represent user input argument definition 331114 of FIG. 33.

FIG. 35 represents the markup language prepared from the flow definition of FIG. 34. usr 3511 and pwd 3521 are input arguments to be inputted by the user converted from usr 3411 and pwd 3421. Description will be given on processing procedure of the flow definition referring to the flow chart of FIG. 36. When execution request of MailMenu() is performed by the browser 334 (Step 3601), the engine program 3332a reads MailMenu.html 351 (Step 3602), and MailMenu.html is sent back to the browser (Step 3603).

The browser 334 displays MailMenu.html (Step 3604). In Step 3605, usr is inputted, and execution request of MailMenu1(usr,pwd) is performed (Step 3606; pwd is undefined). MailMenu1.html 352 is read by the engine program 3332b (Step 3607). The value of usr delivered by argument is placed in %usr of MailMenu1.html read by the variable embedding means 3332b1 (Step 3608), and MailMenu1.html is sent back to the browser 334 (Step 3609).

The browser 334 displays MailMenu1.html (Step 3610). In Step 3611, pwd is inputted, and execution request of MailLogin(usr,pwd) is performed (Step 3612). As described above, it is possible in the eighth embodiment to prepare the engine program and the markup language to media having only one input field.

(9th Embodiment)

Figure 37:
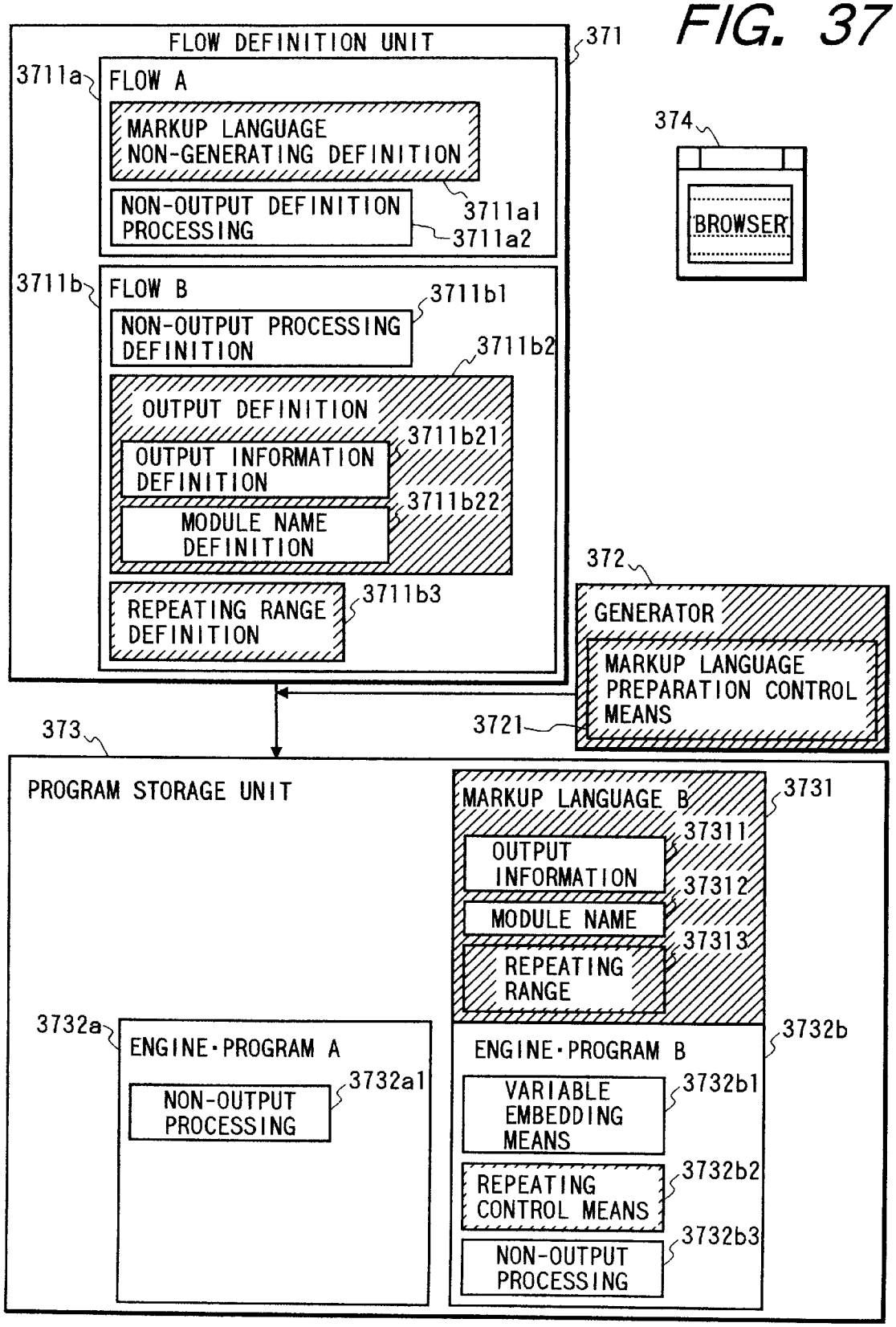
FIG. 37 shows a media flow control system in a ninth embodiment of the present invention.

In the following, description will be given on a media flow control system of a ninth embodiment of the present invention referring to FIG. 37. FIG. 37 shows major arrangement of the media flow control system, and it primarily comprises a flow definition unit 371 containing a flow definition 3711a having a markup language non-generating definition 3711a1 to indicate that it is a module not generating the markup language and a non-output processing definition 3711a2, and a flow definition 3711b, which contains a non-output processing definition 3711b1, an output definition 3711b2 having an output information definition 3711b21 and a module name definition 3711b22, and a repeating range definition 3711b3, a generator 372 having markup language preparation control means 3721, a program storage unit 373 for storing an engine program 3732a having a non-output processing 3732a1, a markup language 3731 containing an output information 37311, a module name 37312 and a repeating range 37313, an engine program 3732b having variable embedding means 3732b1 for embedding variable value to the markup language, repeating control means 3732b2, and a non-output processing 3732b3, and a browser 374. The other components such as object storage unit are not shown in the figure.

The generator 372 generates a markup language 3731 and engine programs 3732a and 3732b from the flow definitions 3711a and 3711b.

Because the markup language non-generating definition 3711a1 is present in the flow definition of 3711a, the markup language to this module is not generated by the markup language preparation control means 3721. The output definition is not present in the flow definition, which has the markup language non-generating definition. The repeating range definition 3711b3 in the flow definition 3711b is converted to the repeating range 37313 in the markup language 3731.

Figure 40:
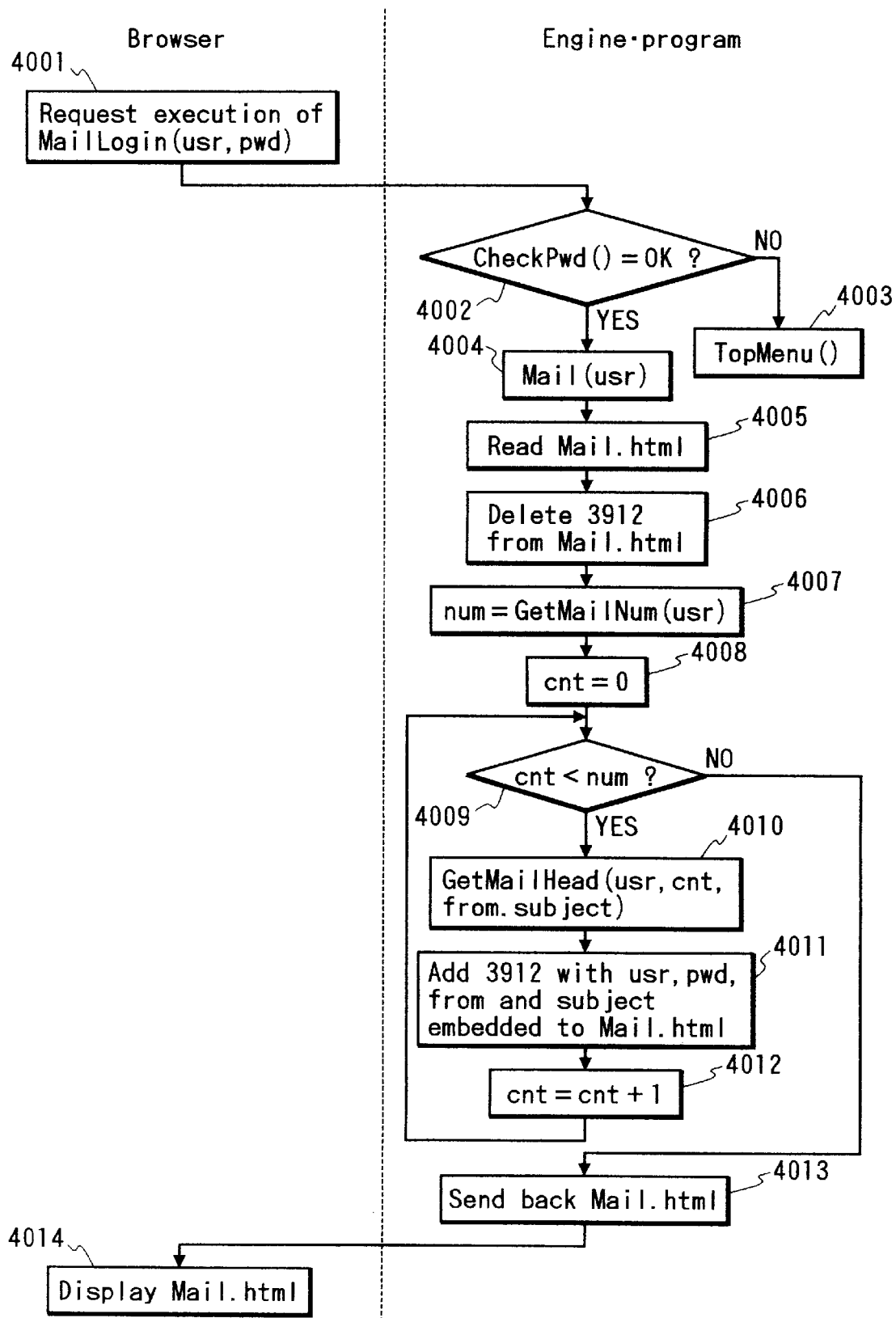
FIG. 40 is a flow chart of a program prepared in the media flow control system in the ninth embodiment of the invention.

Description will be given below on operation of the prepared program referring to FIG. 38, FIG. 39 and FIG. 40. FIG. 38 represents the flow definition, and it comprises modules of MailLogin() 381 and Mail() 382. 3811 represents markup language non-generating definition 3711a1 of FIG. 37, 3821 and 3823 represent repeating range definition 37311b3 of FIG. 37, and 3822 represents output definition 3711b2 of FIG. 37.

FIG. 39 represents the markup language prepared from the flow definition of FIG. 38. <!-- .. --> 3911 and <!-- .. --> 3913 represent information converted from 3821 and 3823 of FIG. 38, and <A.. 3912 represents an output information converted from 3822 of FIG. 38. Description will be given on processing procedure of the flow definition e referring to the flow chart of FIG. 40. By the browser 374, execution request of MailLogin(usr,pwd) is performed (Step 4001). The engine program 3732a executes CheckPwd(), and it is judged whether the result is OK or not (Step 4002). In case the result is NO, TopMenu() is executed (Step 4003). In case the result is YES, Mail(usr) is executed (Step 4004; Engine program 3732b is started). The engine program 3732b reads Mail.html 391 (Step 4005), and <A . . . > 3912 is deleted by the repeating control means 3732b2 from the read Mail.html (Step 4006). GetMailNum() is executed, and number of mails is obtained (Step 4007). cnt is substituted with 0 (Step 4008), and the procedure from Steps 4010 to 4012 is executed while cnt is less than the number of mails (Step 4009).

In Step 4010, GetMailHead() is executed, and the transmitter (from) of the mail and the subject are acquired. In Step 4011, information embedded into %usr, %pwd, %from and %subject of 3912 of FIG. 39 by the variable embedding means 3732b1 is added to Mail.html read by the repeating control means 3732b2.

In case cnt is more than the number of mails, the edited Mail.html is sent back to the browser 374 (Step 4013). The browser 374 displays Mail.html (Step 4014). As described above, it is possible according to the ninth embodiment to define the procedure, which does not contain picture layout information. Also, it is possible to describe a set of indefinite number of information in the markup language.

(10th Embodiment)

Figure 41:
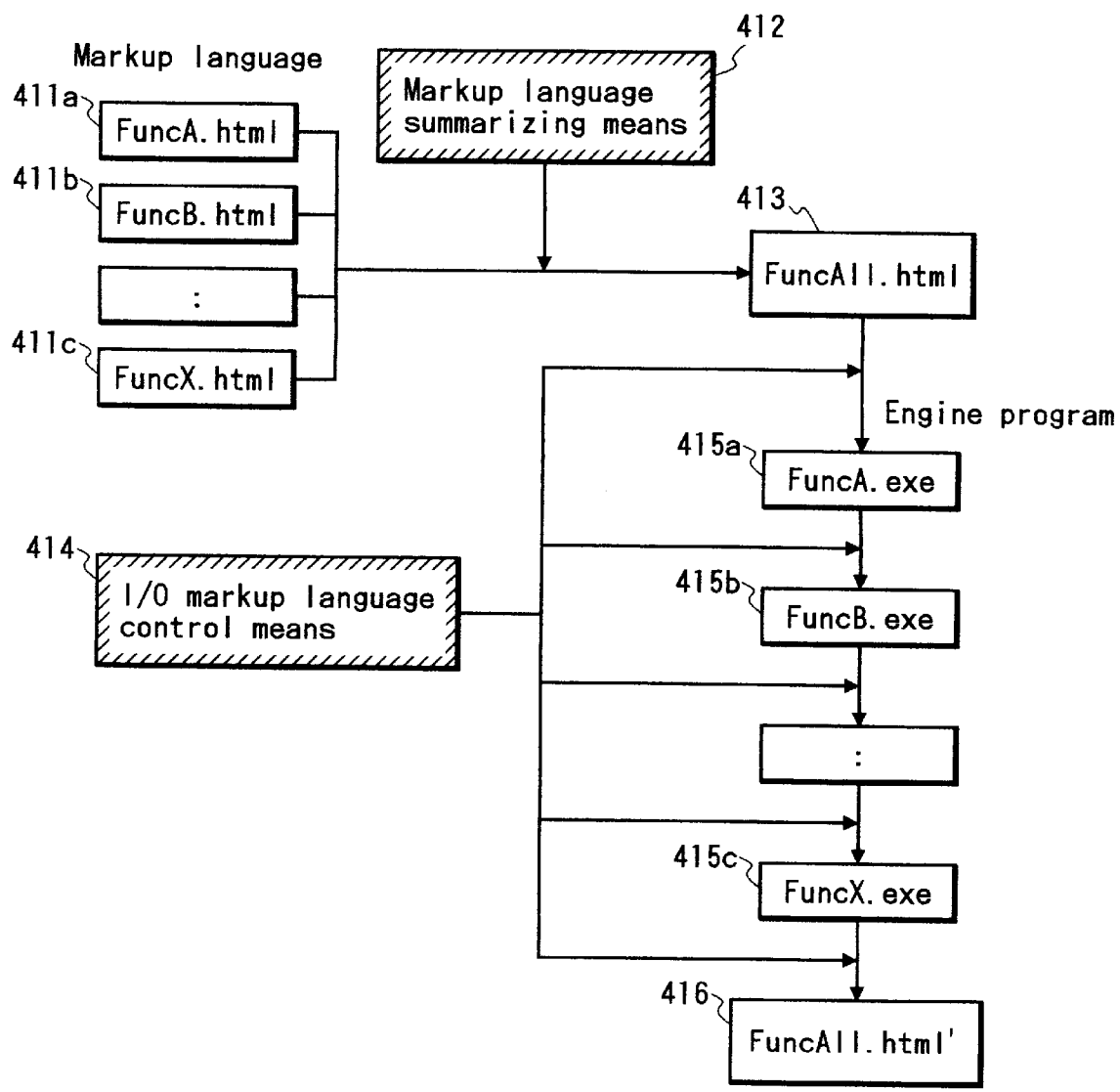
FIG. 41 shows a media flow control system in a tenth embodiment of the present invention.

In the following, description will be given on a media flow control system of a tenth embodiment of the present invention referring to FIG. 41. In FIG. 41, the media flow control system comprises markup languages 411a to 411c of individual programs, markup language summarizing means 412 for summarizing the markup language, the markup language thus summarized, I/O markup language control means 414 for controlling the markup language handled by engine programs, engine programs 415a to 415c storing individual programs to be executed, and markup language 416 as the result of execution of each program.

The markup languages 411a to 411c of individual programs are summarized by the markup language summarizing means 412 and are turned to the markup language 413. The I/O markup language control means 414 gives the summarized markup language of 413 as a markup language for input of the engine program 415a. The I/O markup language control means 414 gives the markup language inputted from the engine program 415a as a markup language for input of the engine program 415b. In this way, input markup language and the output markup language of the engine program are sequentially controlled, and the markup language 416 outputted from the last engine program 415c is handled as the result of output of the combined programs.

As described above, it is possible according to the present invention to use a combination of engine programs and markup languages as components and to prepare a new component by combining them, and to eliminate the need to generate objects one by one from the source program of the engine program to prepare a new component.

As it is evident from the above description, it is possible according to the first and the second embodiments of the present invention to facilitate the description of common flow not dependent on media by separately defining the flow description dependent on a specific media and the flow description not dependent on media.

It is possible according to the third embodiment of the present invention to perform picture layout editing and correction using an editor because the picture layout information is separated from the source code of program and is defined in the markup language.

Because I/O control can be achieved via the browser, which handles the same markup language for all media, it will suffice only to develop a browser for exclusive use of the media newly in case a new media appears.

According to the fourth embodiment of the present invention, it is possible to generate programs not only for data processing of library type but also command type, remote procedure call, etc. and to cope with various types of applications. Also, the stub used in the test can be automatically generated, and the test can be performed in efficient manner.

According to the fifth embodiment of the present invention, it is possible to prevent the intrusion of programs not intended by the manager into the machine for operational management.

According to the sixth embodiment of the present invention, it is possible to turn the procedure to hierarchical by utilizing advantages of non-structured language even in case non-structured language is used for description of the flow.

According to the seventh embodiment of the present invention, it is possible to connect the markup language with the procedure and to easily accomplish the media flow control system using the markup language.

It is possible to easily handle argument by the media flow control system using the markup language.

According to the eighth embodiment of the present invention, it is possible to prepare engine programs and markup languages for the media having only one input field.

According to the ninth embodiment of the present invention, it is possible to define the procedure, which does not contain picture layout information. Also, it is possible to describe a set of an indefinite number of information in the markup language.

According to the tenth embodiment of the present invention, it is possible to use a combination of engine programs and markup languages as components and to prepare a new component by combining them. It is also possible to eliminate the need to generate objects one by one from the source program of the engine program to prepare the components newly.

What is claimed is:

1. A media flow control system, comprising a flow definition unit for collectively defining a common flow definition to define flow of the entire application and an individual flow definition to individually define different flows for each of media, a flow converting program for each of media for converting the flow definition unit to flow definition for each of media and for storing it to a flow definition storage unit for each of media, a generator for automatically generating a special-purpose program for each of media to control input and display of each of media from the flow of the flow definition unit for each of media, and a program storage unit for storing the automatically generated program, whereby the flow definition unit can describe the flow common to a plurality of media.

2. A media flow control system claim 1, wherein the language defined at the common flow definition unit and the individual flow definition unit is a non-structured language, and there is provided a call procedure storage unit for storing a procedure name of the called procedure and value of argument, and it is possible to describe that the control is brought back to the initial procedure as specified by the non-structured language.

3. A media flow control system, comprising a common flow definition unit for defining flow of the entire application, an individual flow definition unit for defining standard flow for each of media, a conversion table for maintaining corresponding information for mapping flow type to describe in the common flow definition unit and flow type in the individual flow definition unit, a type conversion program for converting the common flow definition unit to flow definition for each of media by referring the conversion table and the individual flow definition unit and for storing it to a flow definition storage unit for each of media, a generator for automatically generating a special-purpose program for each of media to control input and display of each of media from the flow definition, and a program storage unit for storing the automatically generated program, whereby the common flow definition unit is converted to flow definition for each of media by referring to the conversion table and the individual flow definition unit.

4. A media flow control system according to claim 2, wherein there are provided, instead of the generator of claim 3 for generating a special-purpose program for each of media, a generator for generating an engine program and a flow control program for executing markup language editable by an editor and capable to include picture design information and for processing data, and reflecting the result of data processing to the markup language, a data processing unit for storing a group of functions for processing data, an object generating unit for generating an object by linking the engine program and the flow control program with the functions in the data processing unit, and a browser for exclusive use for the media and capable to display result of execution of the object generated by the markup language and the object generating unit.

5. A media flow control system according to claim 2, wherein there are a plurality of types such as library, command and remote procedure call as data processing in the data processing unit, and there is provided an interface definition unit for defining interfaces for these processings and the types, and the generator can automatically generate a program, which can call the data processing to correspond to the plurality of types of processings.

6. A media flow control system according to claim 5, wherein there are provided a stub preparation unit for automatically preparing a source code of a stub by referring to information in the interface definition unit and an object generating unit for generating an object by linking the flow control program automatically generated by the generator with the stub prepared by the stub preparation unit.

7. A media flow control system according to claim 6, wherein there are provided a generator for receiving the flow definition tested by utilizing the stub prepared by the stub preparation unit and the markup language and for generating an engine program and a flow control program to be operated and managed from the received flow definition, a data processing unit for storing a group of functions for processing data, an interface definition unit for defining interfaces and types for the processing, and an object generating unit for generating an object by linking the flow control program prepared by the generator with the functions for processing of the data processing unit.

8. A media flow control system according to claim 4, wherein procedure name can be described together with information as the content to be outputted by a language defined at the common flow definition unit and the individual flow definition unit, and the markup language describing the procedure name is generated together with the information as outputted based on the defined language.

9. A media flow control system according to claim 8, wherein, in addition to the content describable by the language defined at the common flow definition unit and the individual flow definition unit, description of input argument of the procedure and argument to request input to the user among the input arguments can be specified, and the markup language is generated, which describes the procedure name and the input argument together with the information as outputted based on the defined language.

10. A media flow control system according to claim 9, wherein, in case there is an input argument requesting input to the user in the content of output, an engine program and the markup language are generated for each argument.

11. A media flow control system claim 8, wherein a range to repeatedly output can be specified in the language defined at the common flow definition unit and the individual flow definition unit, and the markup language to describe the range of repeating is generated based on the defined language.

12. A media flow control system claim 8, wherein there are provided means for summarizing and executing an engine program, means for summarizing the markup language to correspond to the engine program, and means for specifying the markup language to be handled as an input in individual engine program and for specifying destination of output, whereby the summarized markup language is given for input to the engine program of the foremost stage, and output of the engine program of the forward stage is turned to the markup language to handle as input in the engine program of the rear stage, and output of the engine program of the rearmost stage is handled as the markup language after the result of processing.

13. A media flow control system according to claim 4, wherein a procedure not generating the markup language can be described in a language defined at the common flow definition unit and the individual flow definition unit, and the procedure does not include output.

\* \* \* \* \*